US005331344A

United States Patent [19]

Miyagawa et al.

[11] Patent Number: 5,331,344

[45] Date of Patent: Jul. 19, 1994

[54] METHOD FOR PRODUCING LIQUID-DISCHARGING RECORDING HEAD, LIQUID-DISCHARGING RECORDING HEAD PRODUCED BY SAID METHOD, AND RECORDING APPARATUS UTILIZING SAID RECORDING HEAD

[75] Inventors: Masashi Miyagawa; Masanori Takenouchi, both of Yokohama; Katsuhiro Shirota, Inagi; Norio Ohkuma, Yokohama; Yoshihisa Takizawa, Kawasaki; Toshiharu Inui; Kazuhiro Nakajima, both of Yokohama, all of Japan

[73] Assignee: Canon Kabushiki Kaisha, Tokyo, Japan

[21] Appl. No.: 810,126

[22] Filed: Dec. 19, 1991

[30] Foreign Application Priority Data

| | | | |
|---|---|---|---|
| Dec. 19, 1990 | [JP] | Japan | 2-411595 |
| Dec. 19, 1990 | [JP] | Japan | 2-411740 |
| Dec. 19, 1990 | [JP] | Japan | 2-411745 |
| Dec. 19, 1990 | [JP] | Japan | 2-411749 |
| Dec. 19, 1990 | [JP] | Japan | 2-411759 |
| Dec. 19, 1990 | [JP] | Japan | 2-411769 |
| Oct. 31, 1991 | [JP] | Japan | 3-286272 |

[51] Int. Cl.$^5$ ........ G01D 15/16
[52] U.S. Cl. ........ 347/63
[58] Field of Search ........ 346/1.1, 140 R, 75, 346/140 PD, 107; 355/73, 202; 204/11; 430/201, 270

[56] References Cited

U.S. PATENT DOCUMENTS

| | | | |
|---|---|---|---|
| 4,313,124 | 1/1982 | Hara | 346/140 R |
| 4,345,262 | 8/1982 | Shirato et al. | 346/140 R |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,723,129 | 2/1988 | Endo et al. | 346/1.1 |
| 4,740,796 | 4/1988 | Endo et al. | 346/1.1 |
| 4,775,445 | 10/1988 | Noguchi | 156/637 |
| 4,825,246 | 4/1989 | Fukuchi et al. | 355/202 |
| 4,839,001 | 6/1989 | Bakewell | 204/11 |
| 5,266,441 | 11/1993 | Kondo et al. | 430/201 |
| 5,267,755 | 12/1993 | Yamauchi et al. | 283/86 |

FOREIGN PATENT DOCUMENTS

| | | |
|---|---|---|
| 179452 | 4/1986 | European Pat. Off. . |
| 54-56847 | 5/1979 | Japan . |
| 59-123670 | 7/1984 | Japan . |
| 59-138461 | 8/1984 | Japan . |
| 60-71260 | 4/1985 | Japan . |
| 2092960 | 8/1982 | United Kingdom . |

OTHER PUBLICATIONS

Philips Tech. Rev., vol. 35, 41 (1975).

*Primary Examiner*—A. T. Grimley
*Assistant Examiner*—T. A. Dang
*Attorney, Agent, or Firm*—Fitzpatrick, Cella, Harper & Scinto

[57] ABSTRACT

A method for producing a liquid discharging recording head including an ink discharge opening, an ink supply opening, an ink channel communicating with the ink discharge opening and the ink supply opening, and an energy generating element provided corresponding to the ink channel and adapted for generating energy to be utilized for ink discharge comprises the steps of:

forming a first photosensitive material layer for ink channel formation, on a substrate bearing thereon the energy generating element;

pattern exposing the first photosensitive material layer for forming the ink channel;

forming a second photosensitive material layer on the first photosensitive material layer;

pattern exposing the second photosensitive material layer for forming the ink discharge opening and the ink supply opening; and developing the first and the second layers of photosensitive materials.

49 Claims, 11 Drawing Sheets

METHOD FOR PRODUCING LIQUID-DISCHARGING RECORDING HEAD, LIQUID-DISCHARGING RECORDING HEAD PRODUCED BY SAID METHOD, AND RECORDING APPARATUS UTILIZING SAID RECORDING HEAD

BACKGROUND OF THE INVENTION

1. Field of the Invention

The present invention relates to a method for producing a liquid-discharging recording head for recording liquid discharge for use in an ink jet recording method, a liquid-discharging recording head produced by the method, and a recording apparatus equipped with the recording head.

2. Related Background Art

The liquid-discharging recording head adapted for use in an ink jet recording method (hereinafter also called a liquid discharge recording method) is generally provided with a fine liquid discharge opening, an ink channel, and an energy generating element provided corresponding to the ink channel and used for generating energy to be utilized for ink discharge, and, at the recording operation, an ink droplet is discharged from the opening by the function of the energy generating element and is deposited on a recording sheet, thereby forming a record. A conventionally known method for producing such liquid-discharging recording head comprises forming a fine groove or grooves on a glass or metal plate by mechanical working or etching, and adhering such grooved plate with another suitable plate to form the ink channel or channels.

However, the liquid-discharging recording head produced by such conventional method has been associated with a drawback of frequent fluctuation in the recording characteristics because of the lack of consistency in the flow resistance in the ink channel, resulting from the insufficient smoothness of the mechanical finishing of the internal walls of the ink channel, or from the distortion in the ink channel caused by locally different etching rate. Also the mechanical working has been associated with a low production yield because of frequent chipping or cracking of the plate. On the other hand, the etching process is unfavorable in production cost, because of a large number of process steps. Also these conventional methods have been associated with a drawback of difficulty in the alignment of the plate bearing grooves as the ink channels with the substrate bearing piezoelectric elements or electrothermal converting elements for generating the energy for ink discharge, whereby such methods lack adaptability for mass production.

Furthermore, such liquid-discharging recording head is constantly in contact, in the state of use thereof, with the ink liquid, which is generally aqueous and often non-neutral, or is based on organic solvent. For this reason the materials constituting the liquid-discharging recording head are preferably free from deterioration in the strength by the influence from the ink liquid, and are free from undesirable components which deteriorate the performance of the ink liquid upon migration thereinto. However, in the above-mentioned conventional methods, it is often not possible to select the materials meeting these objectives, because of certain limitations in the working steps of these methods.

SUMMARY OF THE INVENTION

In consideration of the foregoing, an object of the present invention is to provide a method for producing an inexpensive, precise and reliable liquid-discharging recording head, a liquid-discharging recording head produced by the method, and a recording apparatus equipped with the recording head.

Another object of the present invention is to provide a method for producing a liquid-discharging recording head, capable of forming the ink channels precisely with a high production yield, a liquid-discharging recording head produced by the method, and a recording apparatus equipped with such recording head.

Still another object of the present invention is to provide a method for producing a liquid-discharging recording head with limited interaction with the ink liquid, improved mechanical strength and improved chemical resistance, a liquid-discharging recording head produced by the method, and a recording apparatus equipped with such recording head.

Still another object of the present invention is to provide a method for producing a liquid-discharging recording head including an ink discharge opening, an ink supply opening, an ink channel communicating with the ink discharge opening and the ink supply opening, and an energy generating element provided corresponding to the ink channel and adapted for generating energy to be utilized for ink discharge, comprising the steps of:

forming a first photosensitive material layer for ink channel formation, on a substrate bearing thereon the energy generating element;

exposing the first photosensitive material layer to a pattern for ink channel formation;

forming a second photosensitive material layer on the first photosensitive material layer;

exposing the second photosensitive material layer to a pattern for formation of ink discharge opening and ink supply opening; and developing the first and the second layers of photosensitive materials.

Still another object of the present invention is to provide a method for producing a liquid-discharging recording head including an ink discharge opening, an ink channel communicating with the ink discharge opening, and an energy generating element provided corresponding to the ink channel and adapted for generating energy to be utilized for ink discharge, comprising steps of:

forming a first photosensitive material layer for ink channel formation on a substrate bearing thereon the energy generating element and the ink supply opening;

exposing the first photosensitive material layer to a pattern for ink channel formation;

forming a second photosensitive material layer on the first photosensitive material layer;

exposing the second photosensitive material layer to a pattern for formation of the ink discharge opening; and developing the first and second layers of photosensitive materials.

Still another object of the present invention is to provide a method for producing a liquid-discharging recording head including an ink discharge opening, an ink supply opening, an ink channel communicating with the ink discharge opening and the ink supply opening, and an energy generating element provided corresponding to the ink channel and adapted for generating energy to be utilized for ink discharge, comprising the steps of:

A) forming a first photosensitive material layer for ink channel formation composed of a thermally crosslinkable positive resist on a substrate bearing thereon the energy generating element, thermally crosslinking the resist, and exposing the crosslinked first photosensitive material layer to a pattern for ink channel formation by an ionizing radiation;

B) forming a second photosensitive material layer composed of thermally crosslinkable positive resist on the exposed first photosensitive material layer, thermally crosslinking the second photosensitive material layer, and exposing the crosslinked second photosensitive material layer to a pattern for formation of the ink discharge opening and the ink supply opening by an ionizing radiation; and C) developing the latent images formed, by the pattern-wise exposures, in the first and second photosensitive material layers;

wherein the steps A, B and C are conducted in successive order.

Still another object of the present invention is to provide a method for producing a liquid-discharging recording head including an ink discharge opening, an ink channel communicating with the ink discharge opening, and an energy generating element provided corresponding to the ink channel and adapted to generate energy to be utilized for ink discharge, comprising the steps of:

A) forming a first photosensitive material layer for ink channel formation composed of a thermally crosslinkable positive resist on a substrate bearing thereon the energy generating element and the ink supply opening, thermally crosslinking the resist, and exposing the crosslinked first photosensitive material layer to a pattern for ink channel formation by an ionizing radiation;

B) forming a second photosensitive material layer composed of a thermally crosslinkable positive resist on the exposed first photosensitive material layer, thermally crosslinking the second photosensitive material layer, and exposing the crosslinked second photosensitive material layer to a pattern for formation of the ink discharge opening by an ionizing radiation; and C) developing the latent images formed, by the pattern-wise exposure, in the first and second photosensitive material layers;

wherein the steps A, B and C are conducted in successive order.

Still another object of the present invention is to provide a method for producing a liquid-discharging recording head including an ink discharge opening, an ink supply opening, an ink channel communicating with the ink discharge opening and the ink supply opening, and an energy generating element provided corresponding to the ink channel and adapted for generating energy to be utilized for ink discharge, comprising the steps of:

A) forming a first photosensitive material layer for ink channel formation composed of a thermally crosslinkable positive resist on a substrate bearing thereon the energy generating element, thermally crosslinking the resist, and exposing the crosslinked first photosensitive material layer to a pattern for ink channel formation by an ionizing radiation;

B) forming a second photosensitive material layer composed of a thermally crosslinkable positive resist on the exposed first photosensitive material layer, thermally crosslinking the second photosensitive material layer at a crosslinking temperature not exceeding that of the first photosensitive material layer, and exposing the crosslinked second photosensitive material layer to a pattern for formation of the ink discharge opening and the ink supply opening by an ionizing radiation; and C) developing the latent images formed, by the pattern-wise exposures, in the photosensitive material layers;

wherein the steps A, B and C are conducted in successive order.

Still another object of the present invention is to provide a method for producing a liquid-discharging recording head including an ink discharge opening, an ink channel communicating with the ink discharge opening, and an energy generating element provided corresponding to the ink channel and adapted for generating energy to be Utilized for ink discharge, comprising the steps of:

A) forming a first photosensitive material layer for ink channel formation composed of a thermally crosslinkable positive resist on a substrate bearing thereon the energy generating element and the ink supply opening, thermally crosslinking the resist, and exposing the crosslinked first photosensitive material layer to a pattern for ink channel formation by an ionizing radiation;

B) forming a second photosensitive material layer composed of a thermally crosslinkable positive resist on the exposed first photosensitive material layer, thermally crosslinking the second photosensitive material layer at a crosslinking temperature not exceeding that of the first photosensitive material layer, and exposing the crosslinked second photosensitive material layer to a pattern for formation of the ink discharge opening by an ionizing radiation; and C) developing the latent images formed, by the pattern-wise exposures, in the photosensitive material layers;

wherein the steps A, B and C are conducted in successive order.

Still another object of the present invention is to provide a method for producing a liquid-discharging recording head comprising:

a first step of forming a first positive crosslinkable photosensitive material layer containing an epoxy group on a substrate bearing thereon an ink discharge energy generating element, thermally crosslinking the first positive photosensitive material layer, and exposing the thermally crosslinked first positive photosensitive material layer to light, thereby forming a latent image of a liquid channel;

a second step of forming a second positive crosslinkable photosensitive material layer containing epoxy group on the first positive photosensitive material layer in which the latent image is formed, thermally crosslinking the second positive photosensitive material layer, and exposing the crosslinked second positive photosensitive material layer to light thereby forming a latent image of a liquid discharge opening; and a third step of developing the first and the second positive photosensitive material layers containing latent images therein, thereby forming the liquid channel and the liquid discharge opening.

Still another object of the present invention is to provide a method for producing a liquid-discharging recording head including an ink discharge opening, an ink supply opening, an ink channel communicating with the ink discharge opening and the ink supply opening, and an energy generating element provided corresponding to the ink channel and adapted for generating energy to be utilized for ink discharge, comprising the steps of:

forming a first photosensitive material layer for ink channel formation composed of a thermally crosslinkable positive resist sensitive to an ionizing radiation on a substrate bearing the energy generating element;

insolubilizing the first photosensitive material layer by crosslinking;

exposing the insolubilized first photosensitive material layer to a pattern for ink channel formation by an ionizing radiation;

forming a second photosensitive material layer, sensitive to light of a main emission wavelength of 300 nm or longer, on the first photosensitive material layer;

exposing the second photosensitive material layer to a pattern for formation of the ink discharge opening and the ink supply opening by light with a main emission wavelength of 300 nm or longer; and developing the first and second photosensitive material layers.

Still another object of the present invention is to provide a method for producing a liquid-discharging recording head including an ink discharge opening, an ink channel communicating with the ink discharge opening, and an energy generating element provided corresponding to the ink channel and adapted for generating energy to be utilized for ink discharge, comprising the steps of:

forming a first photosensitive material layer for ink channel formation, composed of a thermally crosslinkable positive resist sensitive to an ionizing radiation, on a substrate bearing thereon the energy generating element and an ink supply opening;

insolubilizing the first photosensitive material layer by crosslinking;

exposing the insolubilized first photosensitive material layer to a pattern for ink channel formation by an ionizing radiation;

forming a second potosensitive material layer sensitive to light with a main emission wavelength of 300 nm or longer on the first photosensitive material layer;

exposing the second photosensitive material layer to a pattern for formation of the ink discharge opening by light with a main emission wavelength of 300 nm or longer; and developing the first and second photosensitive material layers.

Still another object of the present invention is to provide a method for producing a liquid-discharging recording head including an ink discharge opening, an ink supply opening, an ink channel communicating with the ink discharge opening and the ink supply opening, and an energy generating element provided corresponding to the ink channel and adapted for generating energy to be utilized for ink discharge, comprising the steps of:

forming a first negative photosensitive material layer for ink channel formation, having a predetermined photosensitive spectral region, on a substrate bearing thereon the energy generating element;

exposing the first photosensitive material layer to a pattern for ink channel formation within the predetermined photosensitive spectral region;

forming, on the first photosensitive material layer, a second negative photosensitive material layer with a photosensitive spectral region different from that of the first photosensitive material layer;

exposing the second negative photosensitive material layer to a pattern for formation of the ink discharge opening and the ink supply opening in the different photosensitive spectral region; and developing the first and the second photosensitive material layers.

Still another object of the present invention is to provide a method for producing a liquid-discharging recording head including an ink discharge opening, an ink supply opening, an ink channel communicating with the ink discharge opening and the ink supply opening, and an energy generating element provided corresponding to the ink channel and adapted for generating energy to be utilized for ink discharge, comprising the steps·of:

forming a first negative photosensitive material layer for ink channel formation on a substrate bearing thereon the energy generating element;

exposing the first photosensitive material layer to a pattern for ink channel formation;

forming, on the first photosensitive material layer, a second negative photosensitive material layer of a gelation sensitivity different from that of the first photosensitive layer;

exposing the second photosensitive material layer to a pattern for formation of the ink discharge opening and the ink supply opening; and developing the first and the second photosensitive material layers.

Still another object of the present invention is to provide a method for producing a liquid-discharging recording head including an ink discharge opening, an ink supply opening, an ink channel communicating with the ink discharge opening and the ink supply opening, and an energy generating element provided corresponding to the ink channel and adapted for generating energy to be utilized for ink discharge, comprising the steps of:

forming a first negative photosensitive material layer for ink channel formation on a substrate bearing thereon the energy generating element;

exposing the first photosensitive material layer to a pattern for ink channel formation;

forming, on the first photosensitive material layer, a second negative photosensitive material layer of an average molecular weight larger than that of the first photosensitive material layer;

exposing the second photosensitive material layer to a pattern for formation of the ink discharge opening and the ink supply opening; and developing the first and the second photosensitive material layer.

Still another object of the present invention is to provide a method for producing a liquid-discharging recording head including an ink discharge opening, an ink supply opening, an ink channel communicating with the ink discharge opening and the ink supply opening, and an energy generating element provided corresponding to the ink channel and adapted for generating energy to be utilized for ink discharge, comprising the steps of:

forming a first negative photosensitive material layer for ink channel formation on a substrate bearing thereon the energy generating element;

exposing the first photosensitive material layer to a pattern for ink channel formation;

forming, on the first photosensitive material layer, a second negative photosensitive material layer containing a larger amount of photopolymerization initiator than in the first photosensitive material layer;

exposing the second photosensitive material layer to a pattern for formation of the ink discharge opening and the ink supply opening; and developing the first and second photosensitive material layers.

Still another object of the present invention is to provide a method for producing a liquid-discharging recording head including an ink discharge opening, an ink channel communicating with the ink discharge opening, and an energy generating element provided corresponding to the ink channel and adapted for generating energy to be utilized for ink discharge, comprising the steps of:

forming a first negative photosensitive material layer for ink channel formation, having a predetermined photosensitive spectral region, on a substrate bearing thereon the energy generating element and the ink supply opening;

exposing the first photosensitive material layer to a pattern for ink channel formation within the predetermined photosensitive spectral region;

forming, on the first photosensitive material layer, a second negative photosensitive material layer with a photosensitive spectral region different from that of the first photosensitive material layer;

exposing the second negative photosensitive material layer to a pattern for formation of the ink discharge opening in the different photosensitive spectral region; and developing the first and the second photosensitive material layers.

Still another object of the present invention is to provide a method for producing a liquid-discharging recording head including an ink discharge opening, an ink channel communicating with the ink discharge opening, and an energy generating element provided corresponding to the ink channel and adapted for generating energy to be utilized for ink discharge, comprising the steps of:

forming a first negative photosensitive material layer for ink channel formation on a substrate bearing thereon the energy generating element and provided therein with an ink supply opening;

exposing the first photosensitive material layer to a pattern for ink channel formation;

forming, on the first photosensitive material layer, a second negative photosensitive material layer of a gelation sensitivity to the exposing light different from that of the first photosensitive material layer;

exposing the second photosensitive material layer to a pattern for formation of the ink discharge opening; and developing the first and the second photosensitive material layers.

Still another object of the present invention is to provide a method for producing a liquid-discharging recording head including an ink discharge opening, an ink channel communicating with the ink discharge opening, and an energy generating element provided corresponding to the ink channel and adapted for generating energy to be utilized for ink discharge, comprising the steps of:

forming a first negative photosensitive material layer for ink channel formation on a substrate bearing thereon the energy generating element and the ink supply opening;

exposing the first photosensitive material layer to a pattern for ink channel formation;

forming, on the first photosensitive material layer, a second negative photosensitive material layer of an average molecular weight larger than that of the first photosensitive material layer;

exposing the second photosensitive material layer to a pattern for formation of the ink discharge opening; and developing the first and the second photosensitive material layers.

Still another object of the present invention is to provide a method for producing a liquid-discharging recording head including an ink discharge opening, an ink channel communicating with the ink discharge opening and the ink supply opening, and an energy generating element provided corresponding to the ink channel and adapted for generating energy to be utilized for ink discharge, comprising the steps of:

forming a first negative photosensitive material layer for ink channel formation on a substrate bearing thereon the energy generating element and the ink supply opening;

exposing the first photosensitive material layer to a pattern for ink channel formation;

forming, on the first photosensitive material layer, a second negative photosensitive material layer containing a larger amount of photopolymerization initiator than in the first photosensitive material layer;

exposing the second photosensitive material layer to a pattern for formation of the ink discharge opening; and developing the first and the second photosensitive material layers.

Still another object of the present invention is to provide a method for producing a liquid-discharging recording head including an ink discharge opening, an ink supply opening, an ink channel communicating with the ink discharge opening and the ink supply opening, and an energy generating element provided corresponding to the ink channel and adapted for generating energy to be utilized for ink discharge, comprising:

A) a step of forming a first photosensitive material layer composed of an uncrosslinking resist on a substrate bearing thereon the energy generating element, exposing the first photosensitive material layer to a pattern for formation of the ink discharge opening and the ink channel along the energy generating element, and developing the first photosensitive material layer thereby dissolving the removing the material layer except for the portions corresponding to the ink discharge opening and the ink channel;

B) a step of laminating a second photosensitive material layer composed of a thermally crosslinkable positive resist on the substrate bearing thereon the portions corresponding to the ink discharge opening and the ink channel, thermally crosslinking the second photosensitive material layer, and exposing the layer to a pattern for formation of the ink supply opening by an ionizing radiation; and C) a step of developing and removing the uncrosslinked resist corresponding to the ink channel and the ink discharge opening, and the latent image formed by the patternwise exposure for formation of the ink supply opening;

wherein the steps A, B and C are conducted in successive order.

Furthermore, the present invention includes a liquid-discharging recording head produced by any of the foregoing methods.

Furthermore, the present invention includes a recording apparatus equipped with the recording head mentioned above.

DETAILED DESCRIPTION OF THE PREFERRED EMBODIMENTS

Now the present invention will be clarified in detail by preferred embodiments thereof shown in the attached drawings.

FIGS. 1 to 7 are schematic perspective views showing the method for producing a liquid-discharging recording head of the present invention. The recording head of the present invention is prepared on a substrate 1 shown in FIG. 1. The substrate 1 is composed for example of glass, ceramics, plastics or metals, serving as a part of components constituting an ink liquid channel to be explained later and also as a supporting member for photosensitive material layers also to be explained later, and is not limited in shape or material as long as the above-mentioned objectives are satisfied. The substrate 1 is provided thereon with a predetermined number (two in the illustration) of energy generating elements for generating energy to be utilized for ink discharge, such as electrothermal converting elements or piezoelectric elements. The ink liquid discharge is achieved by the supply of the energy, generating by the energy generating element, to the ink liquid. The ink liquid discharge is achieved, in case the energy generating element 2 is composed of an electrothermal converting element, by the heating, by the element, of the ink liquid present in the vicinity of the element, and, in case the element 2 is composed of a piezoelectric element, by mechanical vibration thereof.

These elements 2 are connected to electrodes (not shown) for entering control signals for activating the elements 2. It is also possible to provide various functional layers, such as a protective layer, for example on the elements 2, for the purpose of improvement of the service life thereof.

Figure 2:
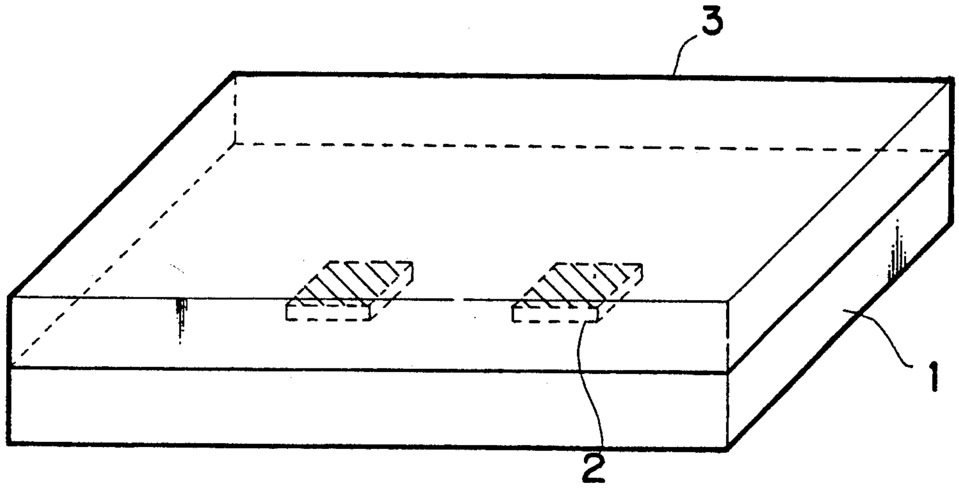
FIG. 2 is a schematic perspective view of a substrate after the formation of a first photosensitive material layer.

Then, as shown in FIG. 2, a first photosensitive material layer 3 is formed on the substrate 1 provided thereon with the energy generating elements 2. The photosensitive material layer 3 may be formed for example by solvent coating method of solution containing a photosensitive material, or by laminating a dry film containing the photosensitive material on the substrate.

The solvent coating method consists of coating the substrate with the solution of photosensitive material by means of a spin coater, a roller coater or a wire bar, and then removing the solvent to obtain a layer of the photosensitive material.

The photosensitive material layer 3 can be composed of ordinarily used photosensitive resins. The photosensitive materials can be in general classified into negative type in which an area irradiated with light remains after the development, and positive type in which an area irradiated with light dissolves after the development. Also they can be classified into those sensitive to ultraviolet or visible light, and those sensitive to ionizing radiations such as deep UV light, electron beam or X-ray.

Examples of negative type resist material for ionizing radiation include polymers including unsaturated double bond in the molecular structure, compounds with epoxy radicals, silicone polymers and vinylic polymers with a hydrogen atom at u-position. More specifically, examples of the polymer including an unsaturated double bond in the molecular structure include rubber polymers such as polybutadiene or polyisoprene, cyclized compounds thereof, diarylphthalate resin, allyl esters of alkylvinylether-maleic anhydride copolymers, polyvinylcinnamate, unsaturated polyesters, and polymers including an acrylic or methacrylic unsaturated double bond in a branched chain.

Such acrylic or methacrylic unsaturated double bond may be introduced by the reaction of a compound having OH, isocyanate, hydroxyl or epoxy radical with methacrylic or acrylic acid. Such acrylic compounds are widely employed for the high sensitivity thereof.

Also examples of the compound having epoxy radical include epoxy resins obtained by reacting a polymer such as phenol novolak resin, cresol novolak resin or polyvinylphenol with epichlorohydrin, epoxy rubber such as epoxypolybutadiene, and epoxy resins obtained by reacting copolymerized resin of hydroxyalkyl(meth)acrylate or (meth)acrylic acid with epichlorohydrin.

Also examples of the silicone polymers include straight-chain silicone resins such as polymethylsiloxane, polydiphenylsiloxane or polyvinylsiloxane, and ladder type silicone resins such as polymethylsilsesquioxane, polyphenylsilsesquioxane or polyvinylsilsesquioxane.

Also examples of the vinyl polymers having a hydrogen atom at the α-position include polyvinyl chloride, polystyrene, polyvinylcarbazole, polyvinylphelocene, polyacrylamide, polyvinylphenol and halogen or halogenated alkylate such as polystylene, polyvinylcarbazole, polyvinylnaphthalene and polyhydroxystyrene.

These polymers, showing gellation by ionizing radiation, may be used as negative type photoresist, but they may be added with an azide or hisazide compound or an onium salt to be explained later, for improving the sensitivity.

Also the negative type resists for ultraviolet or visible light are obtained by adding a photopolymerization initiator for ultraviolet or visible light, a photocrosslinking agent etc. to the above-mentioned negative type resists for ionizing radiation.

The polymers having an unsaturated double bond in the molecular structure can be given a sensitivity to the ultraviolet or visible light by the addition of a photopolymerization initiator or a photocrosslinking agent. Examples of said photopolymerization initiator include diketones such as benzile, 4,4′-dimethoxybenzile, 4,4′-dimethylbenzile or 4,4′-dihydroxybenzile; thioxanthone derivatives such as thioxanthone, 2-chlorothioxanthone, isopropylthioxanthone, 2,4-diethylthioxanthone or 2,4-diisopropylthioxanthone; photosensitive dyes such as 7-diethylamino-3,3′-carbonylbiscoumarine; and Michler's ketones.

Examples of the photocrosslinking agent include azides and bisazides. Such azide or hisazide can crosslink a polymer having an unsaturated double bond in the molecular structure or a vinylic polymer having a hydrogen atom at the α-position, by hydrogen extraction of nitrene, thereby attaining a negative type property. Examples of such azide and hisazide include p-azide-benzaldehyde, p-azide-acetophenone, p-azide-benzoic acid, p-azide-benzalacetophenone, p-azide-benzalacetone, 4,4′-diazidecalcone, 1,3-his-4′-azide-benzal-acetone, 2,6-his-4′-azidebenzalcyclohexanone, and 2,6-bis-4′-azidebenzal-4,4-methylcyclohexanone.

Also the polymers having an epoxy ring in the molecular structure can be given properties as negative type ultraviolet resists by the addition of a cationic photopolymerization initiator such as an onium salt. Examples of the onium salt include diphenyl iodonium salts such as diphenyliodonium hexafluorophosphonate or diphenyliodonium hexafluoroarsenate.

The positive type resist can be composed of positive type photoresist consisting of a mixture of alkali-soluble resin such as novolak resin or polyvinylphenol and a quinonediazide compound.

The positive resist sensitive to ionizing radiation can be a resist consisting of a mixture of alkyl-soluble resin such as novolak resin or polyvinylphenol and an olefinsulfone compound such as 2-methylpentene-1-sulfone, or a positive resist composed of resin decomposable by ionizing radiation.

Examples of such resin decomposable by ionizing radiation include polymethacrylic esters such as polymethyl methacrylate, polyphenyl methacrylate, poly-n-butyl methacrylate or polyhexafluorobutyl methacrylate; vinylketones such as polyvinylketone, polyisopropenylketone or polyphenylketone; olefinsulfones such as polybutene-1-sulfone or poly-2-methylpentene-1-sulfone; and polymers having an atom or a radical other than hydrogen at the α-position such as polymethacrylamide, poly-α-cyanoacrylate or poly-α-methylstyrene.

Figure 3:
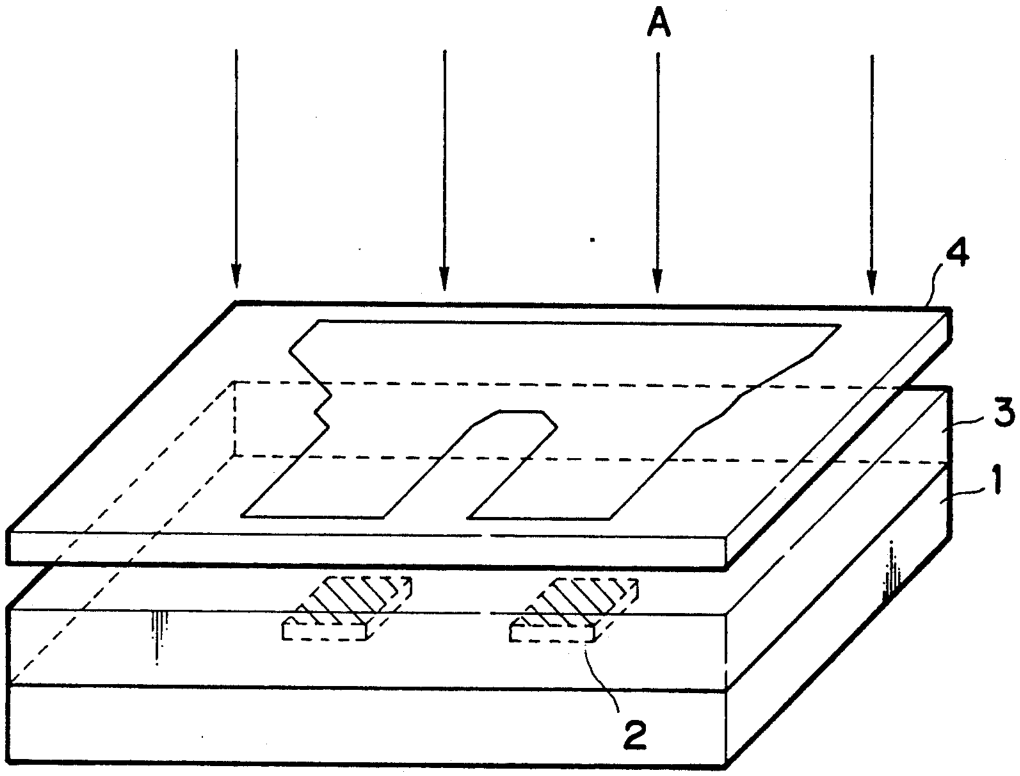
FIG. 3 is a schematic perspective view of a patternwise exposure to be applied to the first photosensitive material layer.

According to the present invention, a mask 4 for ink channel formation is overlaid as shown in FIG. 3 on the first photosensitive material layer 3 formed as explained above, and light irradiation is given in a direction A, whereby a latent image 6 of the pattern of the ink channel is formed in the first photosensitive material layer 3. The exposure may be conducted in a collective exposure through the mask as explained above, or by direct writing with an electron or ion beam. Also the exposure may be conducted not only by the ultraviolet light employed conventionally but also by any radiation capable of patterning the photosensitive material, such as deep UV light, excimer laser, electron beam or X-ray.

Figure 4:
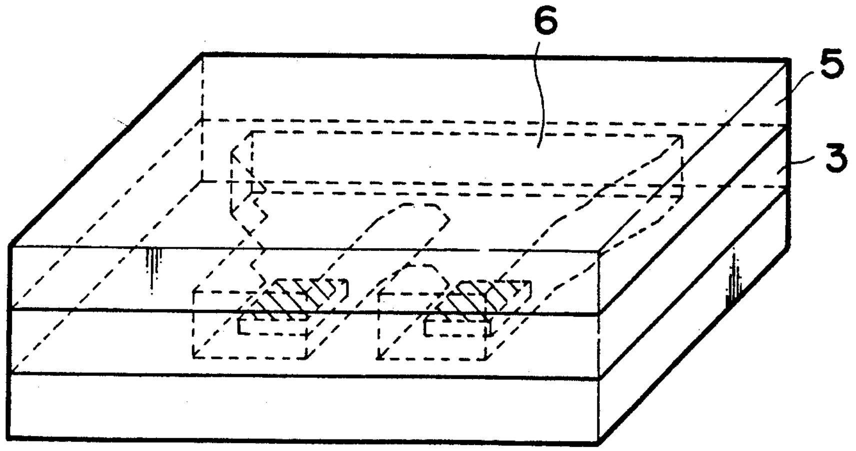
FIGS. 4 an 5 are schematic perspective views showing the state of coating and exposure of a second photosensitive material layer.

On the photosensitive material layer 3 in which the latent image of the ink channel is patterned, there is formed, as shown in FIG. 4, a second photosensitive material layer 5.

The second photosensitive material layer 5 may be basically composed of any of the photosensitive materials mentioned above. However, the photosensitive materials constituting the first and the second layers have to be so selected that they do not mutually affect in the steps of formation of photosensitive material layers and exposures thereof. For example, at the formation of the second photosensitive material layer 5 on the first photosensitive material layer 3, there is required a measure for avoiding the influence to the first layer 3. The influence to the first layer 3 can be made very little if the second layer 5 is formed by lamination of a dry film resist. Also the solvent coating method may be employed if the materials constituting the first and second layers have different solubility characteristics. For example, the first layer 3 may be composed of a material soluble in a strongly polar solvent such as water or alcohol, and the second layer 5 to be coated thereon may be composed of a material soluble in a non-polar solvent such as aromatic solvent, so as not to dissolve the first layer 3.

Furthermore, even if the first and second layers are composed of same or similar materials, the two-layered structure can still be obtained for example by a method of a thin coating of a silane coupling agent on the surface of the first layer 3, or by a method of applying a suitable heat treatment to the first layer 3, or by a method of heating the first layer 3 in atmosphere containing a silicon compound.

Figure 5:
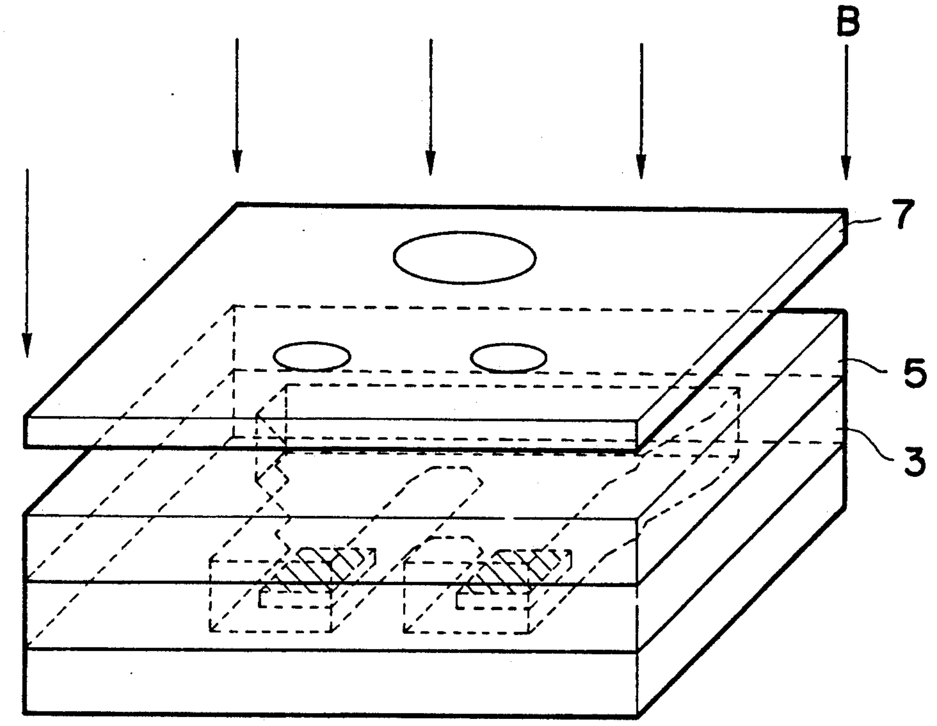
Figure 6:
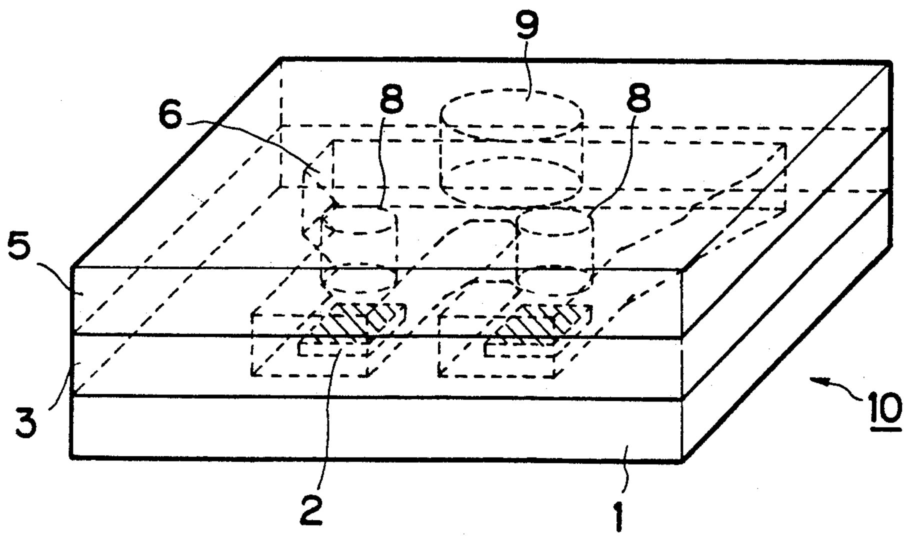
FIG. 6 is a schematic perspective view of patternwise latent images of ink channel, ink discharge opening etc.

The two photosensitive material layers 3, 5 formed in the above-mentioned manner are subjected to a patterned exposure for formation of the ink discharge openings and the ink supply opening as shown in FIG. 5. That is, a mask is placed on the photosensitive material layer 5, and light irradiation is given from above the mask (direction B in FIG. 5), whereby, as shown in FIG. 6, a latent image 8 in the pattern of the ink discharge openings and a latent image 9 in the pattern of the ink supply opening are formed in the photosensitive material layer 5. The pattern exposure can be conducted in a similar manner as that for the first photosensitive material layer 3, but it should be conducted in such a manner that the light for the exposure of the second photosensitive material layer 5 does not affect the first photosensitive material layer 3, or does not practically affect the preparation of the liquid-discharging recording head of the present invention, even if the light affects the first layer 3. More specifically, since the patterns of the ink discharge openings are smaller than that of the ink channel, the light for forming the pattern of the ink discharge openings does not cause problem even if it affects the first layer 3, when the second and first layers 5, 3 are composed of positive type materials. However, in other combinations of materials, for example a positive type first layer 3 and a negative type second layer 5, or a negative type first layer 3 and a positive or negative type second layer 5, there is required a measure for avoiding the influence of the light for forming the pattern of the ink discharge openings on the first layer 3, such as the use of different photosensitive spectral regions or of different sensitivities. Illustration in FIG. 5 is based on the assumption that the first and second photosensitive material layers 3, 5 are both positive type.

Figure 7:
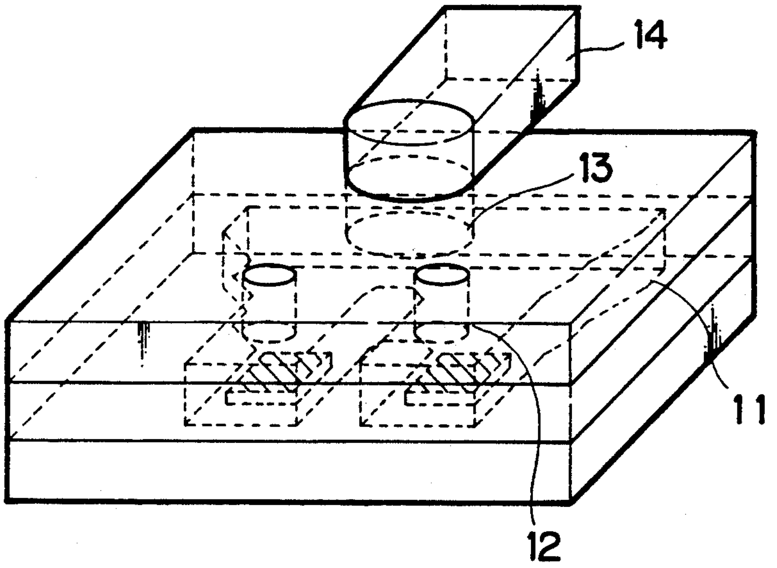
FIG. 7 is a schematic perspective view of a recording head provided with ink supply means.

A block 10, obtained by laminating the first photosensitive material layer 3 and the second photosensitive material layer 5 in succession on the substrate 1, is then subjected to a development process for dissolving the latent image portions 6, 8, 9, whereby, as shown in FIG. 7, the ink channel 11, ink discharge openings 12 and ink supply opening 13 are formed. The ink-discharging recording head of the present invention is thus formed. The first and second layers 3, 5 are collectively developed if the photosensitive materials constituting the layers are developable by a same developer, but are developed in succession by respective suitable developers if they cannot be developed by a same developer. In case of the liquid-discharging recording head shown in FIG. 7, as the liquid discharging direction and the ink supply opening are positioned on the same side of the substrate 1, it is preferable to at first develop the upper second layer 5 and then to develop the lower first layer 3.

In the recording head shown in FIG. 7, the ink supply is rendered possible by providing a connection member 14 for ink supply.

Figure 8:
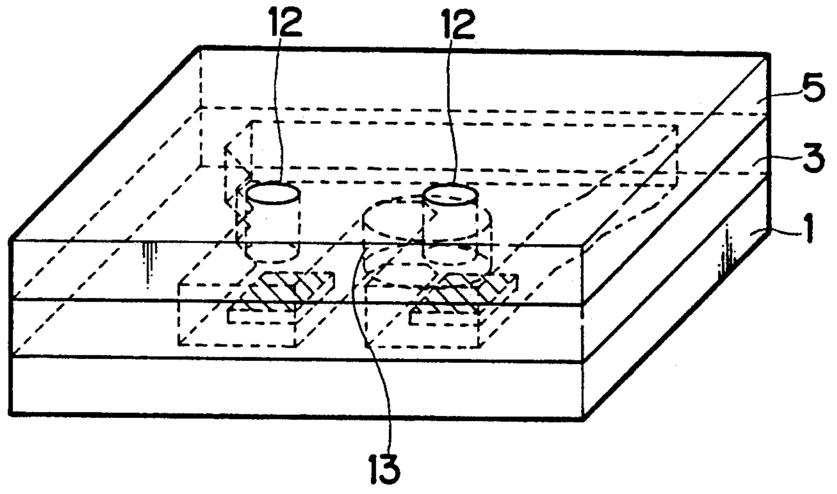
FIG. 8 is a schematic perspective view of the structure, after image development, of a recording head in which the ink supply is conducted from the opposite side of the substrate, with respect to the ink discharging direction.

On the other hand, a liquid-discharging recording head shown in FIG. 8 has an ink supply opening 13 penetrating through the substrate 1, and the head of such structure can be obtained by forming a first photosensitive material layer on a substrate already provided thereon with the ink supply opening and the energy generating elements, exposing the photosensitive material layer to the pattern of an ink channel connecting the ink supply opening with the energy generating elements, then forming a second photosensitive material layer, exposing the second layer to the pattern of ink discharge openings, and finally developing the first and second photosensitive material layers. In such process, the pattern exposure is preferably conducted in such a manner that the ink discharge openings are substantially positioned on the energy generating elements.

Figure 9:
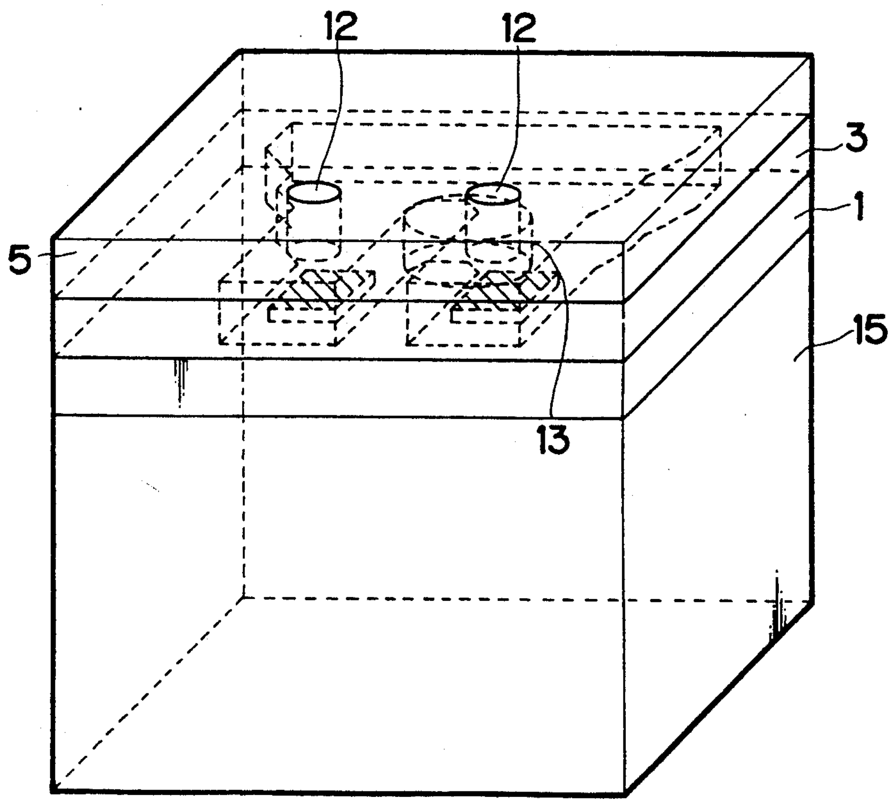
FIG. 9 is a schematic perspective view of a recording head provided with ink supply means.

In such recording head, the ink supply is rendered possible by various methods, by providing an ink supply member 15 as shown in FIG. 9, and the liquid-discharging recording head can be realized in simpler manner. Naturally the ink supply may be achieved by other means or other structure.

In the present embodiment there is shown a liquid-discharging recording head with two liquid discharge openings, but a high-density multiple array liquid-discharging recording head, provided with a larger number of discharge openings, can also be prepared in a similar manner.

In the following there will be explained another embodiment of the present invention.

The present inventors have reached the present embodiment through .a finding that a pattern of a high aspect ratio with little so-called film thickness loss at the image development can be obtained by constituting the recording head with thermally crosslinkable positive resist and thermally crosslinking the same prior to the latent image formation, whereby a recording head with a high ink resistance and a sufficient mechanical strength can be obtained.

The crosslinkable positive resist adapted for use in the present embodiment is a vinylic polymer including a structural unit decomposable by light exposure and a structural unit capable of crosslinking, as represented by the following general formula:

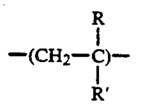

(crosslinkable structure unit) wherein R, R' stand for side chains other than hydrogen atoms.

Examples of the decomposable structural unit include methacrylate esters such as polymethyl methacrylate, polyethyl methacrylate, poly-isopropyl methacrylate, poly-n-butyl methacrylate or poly-tert-butyl methacrylate, poly-α-methylstyrene, polyisobutylene, polymethylisopropynylketone, polyvinylketone and polyphenylisopropynylketone.

Also examples of the crosslinkable structural unit include polymethacrylic acid, acid chloride thereof, and alkyl esters thereof. Among those cited above, methacrylate esters are preferred as the decomposable structural unit in consideration of the sensitivity, and polymechacrylic acid or acid chloride thereof is preferred as the crosslinkable structural unit, in consideration of ease of crosslinking.

The molar ratio of the crosslinkable unit and the decomposable unit in the copolymer is preferably in a range from 1:100 to 100:10. In the following there are shown certain polymers as examples of the thermally crosslinkable positive resist containing the crosslinkable unit and the decomposable unit in a copolymer structure, but the present embodiment is not limited by such examples:

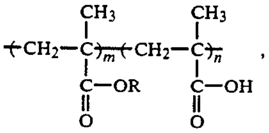

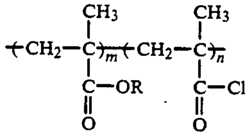

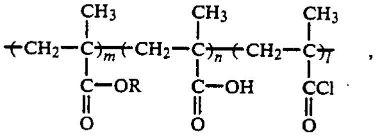

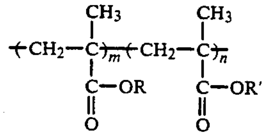

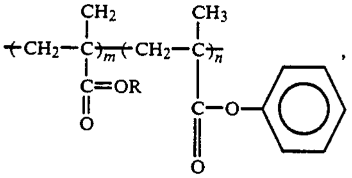

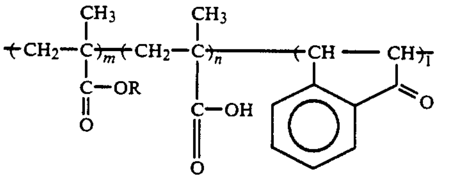

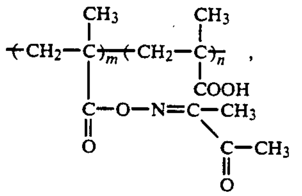

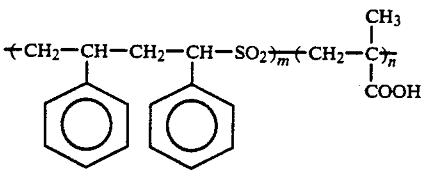

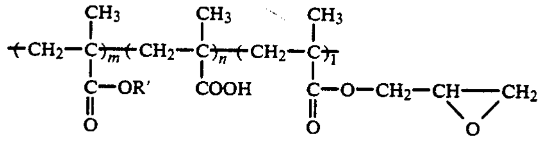

wherein R, R' stand for alkyl radicals, and l, m, n stand for arbitrary integers.

Also there may be employed a compound in which the decomposable structural unit serves also as the crosslinkable structural unit, such as polymethylmethacrylamide represented by the following formula:

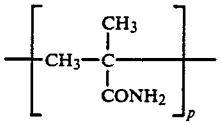

wherein p stands for an integer.

It is also possible to copolymerize another structural unit, for the purpose of adjusting the physical properties (solubility, film forming ability, glass transition point etc.) of the crosslinkable positive resist.

Such thermally crosslinkable positive resists become insoluble in solvent upon heating, by gellation resulting from intermolecular crosslinking, and become soluble in solvent by cleavage of molceular chain, upon irradiation by an ionizing radiation such as X-ray, electron beam or deep UV light having a princila emission wavelength of 300 nm or shorter.

In the present embodiment, the photosensitive material layer formed on the substrate as described before is rendered insoluble in the solvent, by thermal crosslinking, which is preferably conducted for 5 to 60 minutes at 150° to 220° C.

In the present embodiment, the use of crosslinkable positive resist as the constituent material of the recording head provides following advantages:

(1) There is obtained a wide latitude for the developer (little film thickness loss) at the head preparation, and a desired pattern with a high aspect ratio can be obtained;

(2) The recording head of the present embodiment has an extremely high resistance to the recording liquid. Also as the crosslinkable positive resist has a strong crosslinked structure, it has sufficient mechanical strength as the constituent material of the recording head; and (3) Satisfactory adhesion is obtained between the first and second photosensitive material layers. This is presumably because the adhesion can be improved for example by pressure as the second photosensitive material layer can be laminated on the first photosensitive material layer while it is not developed yet, also because of little film thickness loss in said layers, and because a crosslinking reaction takes place between the first and second layers.

In the following there will be explained the deterioration of adhesion resulting from the film thickness loss.

Because the upper resist layer is coated and exposed prior to the development of the lower resist layer, the lower resist layer may show a film thickness loss at the image development, whereby the adhesion between the layers may be lost. In general, negative resists show a smaller film thickness after the development than the film thickness after coating, so that the preparation of recording head without such film thickness loss is relatively difficult. Such negative resists form a pattern by intermolecular crosslinking, but the sensitivity inducing gelation by crosslinking varies significantly by the molecular weight of the resist. Polymer material such as resist inevitably involves a distribution in the molecular weight, and the molecules of lower molecular weights with lower sensitivity are dissolved at the development, thus causing film thickness loss. Naturally the film thickness loss can be reduced by a significant increase in the exposure dose, but an excessive exposure seriously deteriorates the resolving power of the resist.

On the other hand, in positive resists, since the pattern is formed by the difference in the dissolving speed between the exposed area and unexposed area, it is also relatively difficult, in principle, to totally avoid the film thickness loss in the unexposed area. Although the film thickness loss may be reduced by decreasing the dissolving power of the developer (by reducing pH in case of alkali development or by addition of a non-solvent liquid to the developer), there may result other drawbacks such as a prolonged developing time, leading eventually to a loss in productivity.

In contrast, the present embodiment is capable of securely preventing the deteriorated adhesion resulting from the film thickness loss, by the use of the crosslinkable positive resist. The crosslinkable resist is for example based on the principle reported in the Philips Tech Rev., 35, 41 (1975) and is formed by copolymerizing a thermosettable reactive radical to the molecular chain of a photodecomposable polymer (such as methacrylic resin). After the formation of a photosensitive resist layer, the layer is insolubilized by a thermoserring reaction by heating, and a pattern is formed by decomposing the crosslinked molecule in a desired position by exposure to light. The resist shows little film thickness loss because the unexposed area is totally insolubilized in solvent by thermoserring. Also in the preparation of a recording head, there may be required a long developing time because the developer is supplied through small ink discharge openings or a small ink supply opening, but the crosslinkable positive resists are free from the drawbacks of variation in the head dimensions resulting from the change in developing time, because they are almost free from film thickness loss as explained before. Also a stronger developer may be employed for reducing the developing time, without causing the film thickness loss, so that the productivity of the manufacturing operation can be improved.

In the following there will be explained still another embodiment of the present invention.

The present inventors have reached the present embodiment through a finding that, in the preparation of a recording head by patterning the components thereof in plural thermally crosslinkable positive resists and integrally developing the resists, the thermal crosslinking operations of the resists at different crosslinking temperatures can effectively prevent the residue in development, resulting from re-crosslinking of a previously exposed latent image portion.

In the present embodiment, the first photosensitive material layer, formed on the substrate as explained above, is rendered insoluble to solvent and given the mechanical strength required for structural component by thermal crosslinking at a crosslinking temperature $T_1$ (°C.). The insolubilization (gelation) is generally conducted by heating for 5 to 60 minutes at 150° to 220° C., though these conditions vary according to the compound employed.

Also according to the present embodiment, the second photosensitive material layer, laminated on the first photosensitive material layer, is crosslinked by heating at a crosslinking temperature $T_2$ which does not exceed the crosslinking temperature $T_1$ for the first layer. Thus the second layer is crosslinked at a temperature satisfying a condition $T_2 \leqq T_1$. It is therefore rendered possible, at the crosslinking of the second layer, to prevent the re-crosslinking of the latent image of the ink channel corresponding to the exposed area (decomposed portion of molecular chains) in the first layer, thereby avoiding the drawback of residue at the developing step.

The crosslinking temperatures $T_1$, $T_2$ have naturally to be selected higher than the crosslinking start temperatures of respective photosensitive material layers. In the present invention, the crosslinking start temperature is defined by a temperature at which the crosslinking structural unit starts dehydration and dehydrochloric acid reaction, and is identified by a DSC heat absorption peak (initial head absorption peak appearing in the DSC chart, in the measurement with a temperature increasing condition of 10° C./min. starting from the room temperature).

The crosslinking start temperature is variable depending on the structure of various chemical components, but is principally regulable by the length of the alkyl radical in the decomposable structural unit (in general a unit with a longer alkyl radical providing a lower glass transition temperature and thus a lower crosslinking temperature), and by the acid structure in the crosslinkable structural unit (crosslinking temperature becoming higher in the order of carboxylic acid-chloride—carboxylic acid—ester). Also the crosslinking start temperature, solubility and film forming ability can be regulated by copolymerizing another structural unit to the above-mentioned units.

The present embodiment can avoid undesirable influence to the energy generating elements, because of absence of residue in the development in the exposed area.

In the following there will be explained another embodiment of the present invention.

In the aforementioned crosslinkable positive resists, the reactive radical capable of thermal crosslinking is generally copolymer resin of methacrylic acid and methacrylic chloride capable of crosslinking by dehydrochloric acid reaction, or copolymer resin of methacrylic acid capable of crosslinking by dehydration reaction. However the crosslinked structure involving such acid anhydrides tends to be easily hydrolyzed for example by alkali, and may be sometimes defective for use as components in the liquid-discharging recording head. More specifically, the recording ink to be used in such recording head is often maintained at somewhat alkaline state, in order to satisfactorily dissolve the dyes, thereby maintaining stable recording characteristics. For this reason, the above-mentioned crosslinked structure involving acid anhydrides may lack satisfactory stability to the recording ink.

In consideration of the foregoing, the present inventors have reached the present embodiment through a finding that the liquid-discharging recording head stable to the ink can be realized by employing epoxy radical as the crosslinking radical. Such epoxy radical can be easily introduced by copolymerization of a monomer containing an epoxy radical, such as glycidyl methacrylate. Also a thermally cross-linked positive resist film can be easily obtained by adding an already known epoxy setting agent such as amine or acid anhydride to the resin solution and applying a heat treatment.

The unexposed area of the crosslinkable positive resist, being crosslinked by the thermal setting reaction and having a high heat resistance and a high mechanical strength, can show satisfactory durability even under sever conditions of use, such as those of the liquid-discharging recording head. Also because of the crosslinking by the epoxy radical, it can exhibit a high chemical stability to the ink such as alkaline ink.

In the following the present embodiment will be explained in more details, and at first there will be explained crosslinkable positive resist to be employed in the present embodiment.

The crosslinkable positive resist can be obtained in various forms by copolymerizing a thermoserring functional radical to a photodecomposable polymer as explained above. Examples of said photodecomposable polymer include polymers containing ketone in the molecular structure, polymers containing a $SO_2$ molecule in the main chain, such as polysulfone, vinylic polymers containing a non-hydrogen atom at the $\alpha$-position such as methacrylic resin or $\alpha$-methylstyrene.

Examples of polymer containing ketone in the molecular structure include polymers polymerized with a ketone containing a vinyl radical, such as methylvinylketone, methylisopropenylketone, ethylvinylketone, tert-propenylketone or vinyl-phenylketone.

Examples of polymer containing $SO_2$ in the molecular structure include polyolefinsulfone synthesized from an olefin containing an unsaturated double bond and $SO_2$, such as polybutene-1-sulfone known as PBS which is a trade name of MEAD. Naturally the olefin in said polyolefinsulfone may be composed of styrene, $\alpha$-methylstyrene, propylene or any other olefin.

Examples of vinylic polymer containing a non-hydrogen atom at the $\alpha$-position include various homologues of methyl acrylate, such as methyl methacrylate, ethylmethacrylate, n- and iso-propyl methacrylate, n-, iso- and tert-butyl methacrylate etc. Also methacrylamide and methacrylnitrile are usable. Photodecomposable positive resist can be prepared by polymerizing such monomer containing unsaturated double bond. Also commercially available are monomers containing cyano radical, chlorine or fluorine at the $\alpha$-position instead of the methyl radical mentioned above, such as $\alpha$-cyano (or chloro- or fluoro-) acrylate, or $\alpha$-cyano- (or chloro- or fluoro-) ethyl acrylate. Also there may be employed $\alpha$-methyl (chloro, cyano or fluoro) styrene and hydroxy, methyl, ethyl, propyl, chloro and chloro derivatives thereof.

The above-mentioned polymers can be obtained by radical or ionic polymerization of the monomers constituting the molecule, and the photodecomposable polymers can be obtained by polymerization of the above-mentioned monomer or a mixture of plural monomers. The crosslinkable positive resist of the present embodiment can be obtained, in the synthesis of the photodecomposable polymer, by copolymerizing a monomer containing an epoxy radical as the thermoserring functional radical.

Glycidyl methacrylate is most preferred as the monomer containing epoxy radical and providing, upon polymerization, the resin decomposable by ionizing radiation. The crosslinkable positive resist of the present embodiment can be obtained by copolymerizing the monomer, containing the thermocrosslinking functional radical, with a proportion of 5–70 mol. % in the aforementioned photodecomposable polymer.

For example, the thermocrosslinkable positive resist consisting of copolymer of methyl methacrylate and glycidyl methacrylate can be easily synthesized by mixing methyl methacrylate and glycidyl methacrylate with a predetermined molar ratio and stirring the mixture at 60° C.–80° C., with the addition of a radical polymerization initiator, such as AIBN, in an amount of several per cent.

In case the content of the monomer containing the thermally crosslinking functional radical (such as glycidyl methacrylate) in the copolymer is less than 5 mol. %, the lower resist layer cannot be completely crosslinked, so that it may show a film thickness loss or cracks at the development step. On the other hand, in case the content exceeds 70 mol. %, there will result an extremely decrease in the sensitivity, and the thermally set film becomes extremely brittle and is unable to show enough mechanical strength.

Examples of the hardening agent for thermally setting the epoxy radical include aliphatic polyamines such as triethylenetetramine, tetraethylenepentamine or diethylaminopropylamine; aromatic polyamines such as 4,4'-diaminodiphenylmethane or m-xylylenediamine; polyamides; acid anhydrides such as phthalic anhydride or trimeritic anhydride; Lewis acids such as boron trifluoride-amine complex. Such hardening agent is preferably added in an amount within a range of 0.001 wt. %–5 wt. %. A smaller amount of addition will result in crack formation at the development step and in insufficient mechanical strength and thermal resistance, while an amount of addition exceeding 5 wt. % will result in an extremely reduced sensitivity.

The film of such thermally crosslinkable positive resist can be formed on the substrate for example by dissolving the resist in a solvent such as cyclohexanone or 2-ethoxyethyl acetate and directly coating thus obtained solution onto the substrate by spin coating, bar coating or roller coating, followed by drying, or by coating the solution on a supporting material composed for example of polyethylene terephthalate or aramide, followed by drying and laminating thus obtained film onto the substrate.

The time and temperature of thermal crosslinking have to be optimized for respective polymer, but the crosslinking is preferably conducted, in general, for 5 to 30 minutes at 60° C. to 300° C. Crosslinking conducted below 60° C. results in crack formation in the film at the developing step, while that conducted above 300° C. results in a sensitivity decrease.

In the hardening of epoxy radical, the kind and amount of hardening agent, the hardening temperature and time have to be respectively optimized as explained above. Insufficient hardening results in crack formation in the film at the development step, and in insufficient mechanical strength and thermal resistance of the film. Also excessive hardening results in an extremely decrease of sensitivity. In order to avoid these drawbacks, the film may naturally be heated after the development in order to improve the strength thereof.

The exposure of the thermally crosslinkable positive resist of the present embodiment is preferably conducted, as explained before, by an ionizing radiation. There can be employed deep UV light of a wavelength of 250–300 nm obtained from a Xe-Hg lamp which is an ordinarily employed deep UV source, an electron beam, X-ray (SOR), gamma-ray or light from an excimer laser. The exposure may be conducted by a collective exposure through a mask, a step and repeat exposure or an electron beam scanning.

In the exposure with the light of short wavelength such as deep UV light or excimer laser light, the transmittance of the resist film becomes important. For example, a molecular structure containing aromatic rings therein shows a very poor transmittance to the light of a wavelength of 300 nm, so that the exposure can be made only on a very thin film. On the other hand, X-ray or electron beam can be used for a thicker film, because of higher penetrating ability than the light.

The development can be conducted with an organic solvent or an aqueous solution of alkali ordinarily employed for this purpose. Examples of usable developer include ketones such as methylisobutylketone or 2-butanone; esters such as ethyl acetate or 2-ethoxyethyl acetate; aromatic solvents such as toluene or xylene, chlorinated solvents such as chlorobenzene or trichloroethane; ethers; and aqueous solutions of alkali such as sodium hydroxide or tetrahydroxy ammonium.

The present embodiment allows to produce a liquid-discharging recording head of high durability, since the thermally crosslinkable positive resist is not soluble in solvent and is excellent in mechanical strength and in heat resistance. Also the use of thermally crosslinkable positive resist employing epoxy radical as the thermal crosslinking radical, which is hardly hydrolyzed even with alkali, allows to produce a liquid-discharging recording head resistant to deterioration.

In the following there will be explained still another embodiment of the present invention.

In the present embodiment, the second photosensitive material layer 5 is composed of a positive or negative resist sensitive to the light having a principal emission wavelength of 300 nm or longer.

As shown in FIG. 5, a mask 7 is placed on the photosensitive material layer 5, and light irradiation is conducted from above said mask (direction B in FIG. 5), with the light having a principal emission wavelength of 300 nm of longer, thereby forming, as shown in FIG. 6, a latent image 8 of the ink discharge openings and a latent image 9 of the ink supply opening in the layer 5. Since the light employed for the exposure of the second photosensitive material layer 5 has a principal emission wavelength of 300 nm or longer, it does not cause drawbacks such as decomposition of molecular chains even if the first photosensitive material layer 3 is exposed to the light.

In the following there will be explained still another embodiment of the present invention.

In the present embodiment, negative resists are considered superior, in the selection of the resist for which required are mechanical strength, heat resistance, absence of deterioration and absence of dissolution of undesirable substances even after prolonged contact with the ink. More specifically, ordinarily available polymers can form negative working resists by the addition of a photopolymerization initiator or a photocrosslinking agent, and also exhibit negative working characteristic, even in the absence of the photopolymerization initiator, by crosslinking induced by irradiation of an ionizing radiation such as deep UV light, electron beam or X-ray. In consideration of the foregoing, the use of a negative working resist in the production of the liquid-discharging recording head widens the freedom of material selection, and is effective for cost reduction and improvement of head performance.

However, in the method of the present invention, in which a liquid-discharging recording head is produced by photolithographically patterning upper and lower photosensitive material layers, there may result an inconvenience if negative working resists are selected for the upper and lower layers because, in the structure of said recording head, the upper resist layer has to remain in the area above the ink channel. If negative resists are employed as mentioned above, the resist layer positioned above the ink channel has to be exposed, and the resist in the ink channel is also exposed to the exposing light whereby the ink channel becomes closed. Though it is still possible to suitably optimize the thicknesses and the absorption coefficients of the resist layers thereby decreasing the amount of light reaching the lower resist layer and substantially preventing the lower resist layer from being exposed, such optimization of resist thicknesses and absorption coefficients may undesirably affect the designing of head or production stability thereof.

For avoiding the exposure of the lower resist layer at the exposure of the upper resist layer, the present inventors have conceived the use of resist materials of different photosensitive spectral regions for the upper and lower layers, or the use of resist materials of significantly different sensitivities even if they are sensitive to a same wavelength, thereby reaching the present embodiment.

In the present embodiment, the first negative photosensitive material layer (lower resist layer) 3 has a photosensitive spectral region, or a gelation sensitivity to the exposing light for latent image formation, different from that of the second negative photosensitive material layer (upper resist layer) 5.

The present embodiment employs photosensitive material layers of mutually different photosensitive spectral regions or mutually different gelation sensitivities, whereby the patterned latent image can be formed in a desired layer only, without causing gelation in the other layer.

The resists of different photosensitive spectral regions may be generally classified into those sensitive to so-called ionizing radiation such as deep UV light, electron beam or X-ray, and those sensitive to the ultraviolet light.

The specific materials constituting the resists are same as already described before, and, within the photopolymerization initiators to be added to the compound containing unsaturated double bond, diketones such as benzyl, 4,4'-dimethoxydibenzyl, 4,4-dimethylbenzyl or 4,4-dihydroxybenzyl have an absorption maximum in a range of 300–360 nm, while thioxanthone derivatives such as thioxanthone, 2-chlorothioxanthone, isopropylthioxanthone, 2,4-diethylthioxanthone or 2,4-diisopropylthioxanthone have an absorption maximum in a range of 360–430 nm, and 7-diethylamino-3,3'-carbonylbiscoumarine has an absorption maximum at about 450 nm. Thus, even within the ultraviolet region, there can be obtained a combination of resists of mutually different photosensitive spectral regions, by suitably combining these photopolymerization initiators. In the cationic photopolymerization, it is advantageous to add an onium salt as a cation generator to the aforementioned epoxy or vinylether compound, and also a radical photopolymerization initiator mentioned before in order to vary the photosensitive spectral region.

As examples of combination of the resists of different sensitivities, there may be employed a resist for ionizing radiation in the lower layer and a resist for ultraviolet light in the upper layer, or resists for ultraviolet light with mutually different photosensitive spectral regions for the upper and lower layers. In the resist for ultraviolet light, the photosensitive spectral region can be arbitrarily changed by the photosensitive material to be added. The resist sensitive to the ionizing radiation is more effectively used in the lower layer, since almost all the polymers are sensitive to the ionizing radiations.

In the use of resists of different sensitivites, the sensitivity of the lower layer is preferably lower than that of the upper layer, as described before. In case the upper and lower resist layers are composed of a same material system, the sensitivity can be easily regulated by controlling the amount of the photopolymerization initiator. Naturally the sensitivity of resist often varies depending on the thickness of resist layer, but, in the present embodiment, the sensitivities of resists are defined same if the resists have same composition. The sensitivity may be varied for example by a change in the initiator, in the additives, or in the molecular weight of the polymer. The effectiveness of difference of the sensitivities of the upper and lower resist layers on the production of the liquid-discharging recording head of the present embodiment is variable, depending on the thicknesses of the upper and lower resist layers, kind of substrate, exposing wavelength and tool etc., but a difference of 2 to 10 times is generally considered effective. A difference smaller than two times induces the gelation of the lower resist layer by the light used for exposure of the upper resist layer. On the other hand, a difference larger than 10 times facilitates the production process but may result in a drawback such as a prolonged exposure time, because the sensitivity of the lower resist layer becomes very low.

The preparation of the liquid-discharging recording head according to the present embodiment, by employing resists of different sensitivities, allows to use a same exposure apparatus, and realizes a significant saving in the investment in equipment.

In the following there will be explained still another embodiment of the present invention. When a negative photosensitive material layer is formed on a substrate, sufficient adhesion strength is often not obtained, and the causes of such insufficient adhesion have been estimated by the investigation of the present inventors as follows. The negative photosensitive material generally shows a film thickness loss of about 5 to 20%, namely the dissolution of uncrosslinked molecules in the development step after the exposure. On the other hand, the steric arrangement of molecules constituting the photosensitive resin is determined by the crosslinking reaction caused by the exposure to light. Thus there are generated a decrease in the number of molecules constituting the adhesion plane to the substrate, and stresses among the molecules, thereby reducing the force of adhesion. Also even in the absence of dissolution of uncrosslinked components, stress tends to accumulate within the resin film, because the positions of intermolecular crosslinkings are determined before the contraction of volume takes place in the hardening reaction induced by photocrosslinking. On the other hand, in the thermal hardening reaction, the stress is less likely to accumulate inside the material, because the crosslinking reaction occurs after the material is thermally fused. For this reason, a higher adhesion strength can be achieved by the thermal hardening reaction than in the photohardening reaction.

Although the pattern formation by thermal hardening provides better adhesion strength as explained above, the photolithographic process utilizing optical exposure is more advantageous for the precise pattern formation of the ink supply opening etc.

The present inventors have reached the present embodiment by employing thermosetting positive resist instead of negative resist. More specifically, the present embodiment is based on a finding that a very high adhesion strength can be attained by at first forming the ink channel, ink discharge openings etc. with a dissolvable resist pattern, then forming a thermosetting positive resist layer on the pattern, and hardening the positive resist by heating, and that a highly precise recording head can be produced by applying optical exposure to the positive resist for forming the ink discharge openings etc., and developing the positive resist so as to remove the resist in the portions corresponding to the ink channel, ink discharge openings etc.

Figure 13:
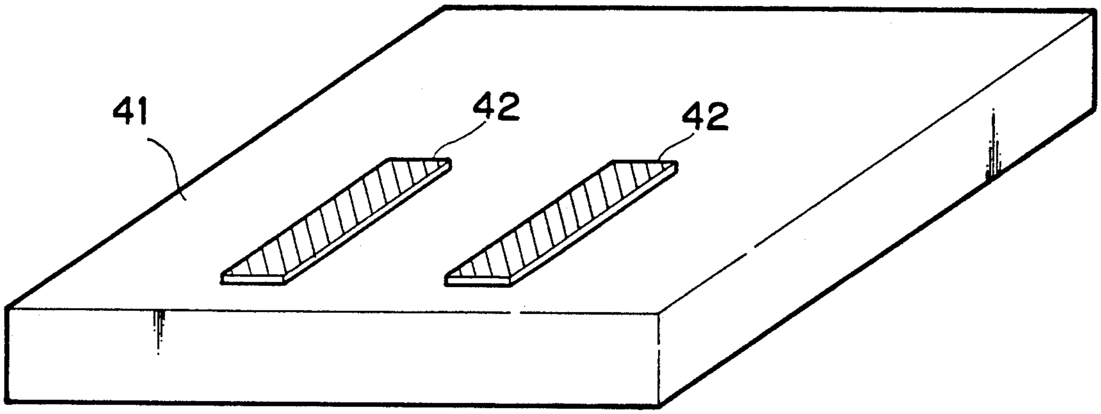
FIG. 13 is a schematic perspective view of a substrate, prior to the formation of ink channel and ink discharge opening, in an embodiment of the head producing method of the present invention.
Figure 14:
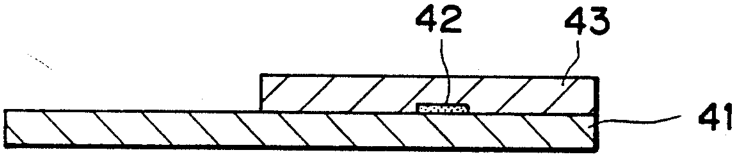
FIG. 14 is a schematic lateral cross-sectional view of the substrate, after the formation of a first photosensitive material layer, in an embodiment of the head producing method of the present invention.

According to the present embodiment, on a substrate 41 ( FIG. 13 ) provided thereon with energy generating elements 42, there is formed a first photosensitive material layer 43 consisting of non-crosslinking resist, as shown in FIG. 14. The non-crosslinking resist is free from gelation by crosslinking and can therefore be dissolved out by a suitable solvent. Examples of such non-crosslinking dissolvable resist include a mixed system of alkali soluble resin and a dissolution inhibitor (such as naphthoquinone diazide ), which effects pattern formation not by gelation of resin but by a change of solubility in the developer. Also there may be employed other conventional positive resists, positive deep-UV ( electron beam or X-ray ) resists, and negative resists effecting pattern formation by a change in the solubility characteristics. In principle there may be employed any resist of which pattern formation does not rely on the gelation reaction by exposure to light, but, in practice, following two requirements are preferably met in order to improve the performance of the liquid-discharging recording head and/or to improve the productivity of such recording head:

1) The dissolvable non-crosslinking resist should preferably have a high heat resistance.

That is, the ordinary positive photoresists, consisting of a mixture of cresol novolak resin and naphthoquinone diazide, have a softening point in a range of 100° C.–130° C. Upon prolonged exposure to a temperature of 100° C. or higher, the novolak resin starts thermal hardening and the dissolution becomes more difficult. The thermosetting positive resist preferably have a hardening temperature of 100° C. or higher as explained above, and the dissolvable resist is preferably free from the gelation, or variation in the dissolving property, at 100° C. More specifically, it is preferably based on a copolymer resin of polyvinylphenol and methacrylic acid. The ratio of methacrylic acid in the copolymer is so determined that the copolymer is soluble in alkali, and is generally in a range of 30–100%. With a ratio lower than 30%, the copolymer becomes insoluble in aqueous alkali solution and incapable of showing positive working characteristic.

A resist not consisting of the mixture of alkali soluble resin and naphthoquinone diazide but showing positive working characteristic by molecular weight reduction result from breakage of molecular chain is also usable if it does cause gelation by heating. Within this category, ordinary resists sensitive to ionizing radiation are usable, Also among the thermally crosslinking positive resists to be explained later, those not containing a thermally crosslinking component in the copolymer can be utilized.

2) The dissolvable non-crosslinking resist should have low gelation tendency or should be decomposable by ionizing radiation.

More specifically, in the positive resist consisting of a mixture of alkali soluble resin and a dissolution inhibitor such as naphthoquinone diazide or polyolefinsulfone, the alkali soluble resin may show gelation by ionizing radiation such as deep UV light to be applied in a successive step to be explained later. Such resin may result in gelation of the dissolvable pattern at the patterning of the ink supply opening etc. by optical exposure of the thermally hardening resist. Although the material showing gelation may still be usable depending on the transmittance or film thickness in relation to the exposure wavelength to be employed, the sensitivity to gelation can be generally reduced by copolymerization of the aforementioned vinylic monomer having a substituent other than hydrogen atom at the α-position.

The first photosensitive material layer 43 can be formed by solvent coating of solution containing the photosensitive material, or by preparing a dry film containing the photosensitive material and laminating the dry film onto the substrate.

Figure 15:
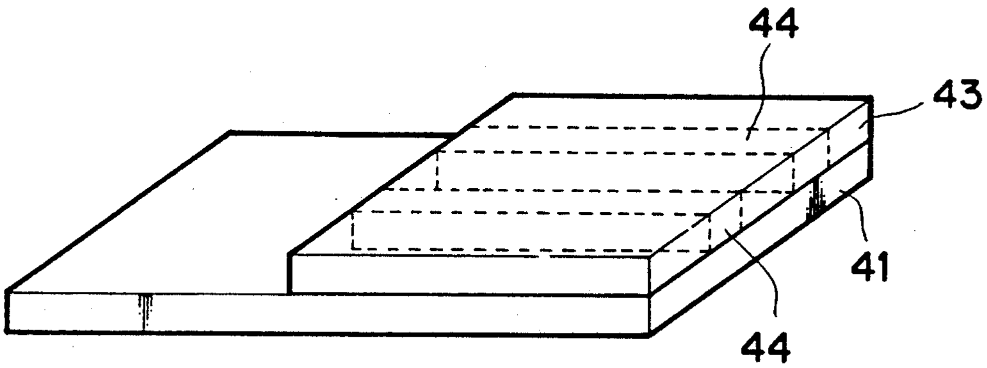
FIG. 15 is a schematic perspective view of a state after the formation of a patternwise latent image in a first photosensitive material layer, in an embodiment of the head producing method of the present invention.

The first photosensitive material layer 43 prepared as explained above is subjected to an exposure as shown in FIG. 15, thereby forming a latent image 44 of the ink channel and the ink discharge openings. The exposure may be conducted by a collective exposure through a photomask, or by a direct exposure with an electron beam or an ion beam. For the exposure, there may be employed any exposing light capable of patterning the photosensitive material, such as deep UV light, light from an excimer laser, an electron beam or X-ray.

Figure 16:
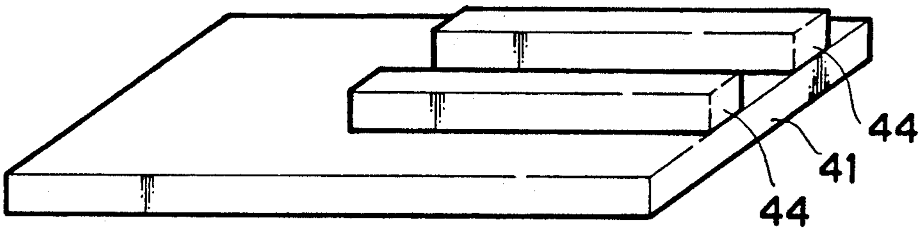
FIG. 16 is a schematic perspective view of a state after the development of said patternwise latent image, in an embodiment of the head producing method of the present invention.

After the above-explained exposure for forming the ink channel and the ink discharge openings, the photosensitive material is subjected to a developing step to remove the material except for the latent image portions 44 mentioned above (FIG. 16).

Figure 17:
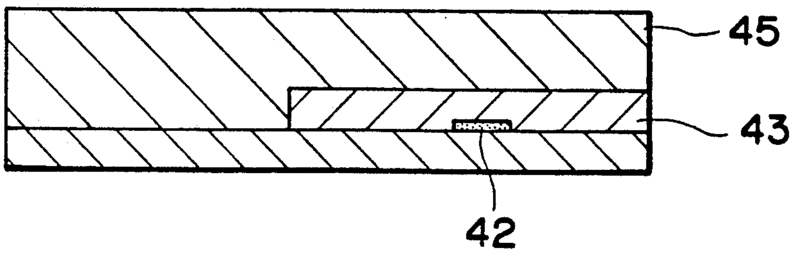
FIG. 17 is a schematic lateral cross-sectional view showing the laminated state of a second photosensitive material layer, in an embodiment of the head producing method of the present invention.

Then, on the substrate 41 provided thereon with the portions corresponding to the ink discharge openings and the ink channel, there is formed a second photosensitive material layer 45 consisting of thermally crosslinking positive resist as shown in FIG. 17. The thermally crosslinkable positive resist contains a monomer, containing a thermosetting reactive radical and copolymerized to the molecular changing of a potodecomposable polymer. The positive resist becomes insolubilized in solvent by a thermosetting reaction caused by heating and forms a pattern by breakage of crosslinked molecules in desired portions by exposure to light. Such resist is almost free from film thickess loss in the unexposed area because it is rendered completely insoluble in solvent by thermal hardening. The developing time may become longer because the developer is supplied through a small aperture such as the ink supply opening or the ink channel, but the head can be produced without drawbacks such as dimensional fluctuation, as the thermally crosslinking positive resist is free from film thickness loss as explained above. Also the efficiency of production can be improved by the reduction in developing time through the use of a stronger developer, as such developer does not cause film thickness loss and nor the peeling of resist in the ink channel and the ink discharge openings.

Furthermore, the unexposed portion of the thermally crosslinking positive resist, being crosslinked by thermal hardening reaction, has a high heat resistance and a high mechanical strength, and can therefore realize satisfactory durability even in the product to be used under severe conditions, such as the liquid-discharging recording head.

The thermally crosslinking positive resist can be obtained in various structures, by copolymerizing a thermosettable functional radical to a photodecomposable polymer as explained before. Examples of such photodecomposable polymer include polymers containing ketone in the molecular structure, those containing $SO_2$ in the main molecular chain, such as polysulfone, and vinylic polymers containing a non-hydrogen atom at the α-position.

Examples of the polymer containing ketone in the molecular structure include polymers of a ketone containing vinyl radical, such as methylvinylketone, methylisopropenylketone, ethylvinylketone, tert-propenylketone or vinylphenylketone.

Examples of the polymer containing $SO_2$ include polysulfone synthesized by the reaction of bisphenol-A and dichlorodiphenylsulfone (Udel Polysulfone supplied by UCC), polyethersulfone synthesized from dichlorodiphenylsulfone (Victrex supplied by ICI), and polyolefinsulfone synthesized from an olefin containing unsaturated double bond and $SO_2$(Polybutene-1-sulfone PBS supplied by Mead). Naturally polyolefinsulfone may contain other olefins such as styrene, α-methylstyrene or propylene.

Examples of the vinylic polymer containing a non-hydrogen substituent at the α-position includes the various homologues of methyl acrylate, such as methyl methacrylate, ethyl methacrylate, n- or iso-propyl methacrylate, and n-, iso- or tert-butyl methacrylate. Also there may be employed methacrylamide or methacrylnitrile. Photodecomposable positive resist can be obtained by polymerizing these monomers containing unsaturated double bond. Also commercially available are monomers having cyano radical, chlorine or fluorine at the α-positive instead of methyl radical mentioned above, such as α-cyano (or chloro- or fluoro-)acrylate, or e-cyano (or chloro- or fluoro) ethylacrylate. Furthermore there may be employed -methyl (or chloro-, cyano- or fluoro-)styrene, or hydroxy, methyl, ethyl, propyl, chloro or fluoro derivative thereof. Photo decomposable polymer can be obtained by polymerizing one of the above-mentioned monomers, or a mixture of plural monomers. The crosslinkable positive resist of the present embodiment can be obtained, at the synthesis of the photodecomposable polymer, by copolymerizing a monomer containing a thermosetting functional radical.

The thermosetting functional radical can for example be hydroxy radical, chlorine, isocyanate or epoxy, and examples of the monomer containing such functional radical include hydroxy (meth)acrylate, hydroxyalkyl (for example methyl, ethyl or propyl) acrylate, hydroxyalkyl methacrylate, acrylchloride, methacryl chloride, and glycidyl methacrylate. The thermally crosslinkable positive resist of the present embodiment can be obtained by copolymerizing the monomer containing the thermally crosslinking functional radical, with a content of 0.1 to 70 mol. %, in the above-mentioned photodecomposable polymer.

If the ratio of the monomer in the copolymer is less than 0.1 mol. %, the lower resist film is not completely hardened, and gives rise to a film thickess loss or crack formation at the developing step. On the other hand, a ratio higher than 70 mol. % leads to a deteriorated sensitivity or crack formation by the excessive thermal hardening.

Such thermally crosslinkable positive resist can be coated onto the substrate, either directly or after dissolving in a solvent if said resist is solid, with a spin coater or a bar coater. In such coating, there is required a measure for preventing the influence to the first photosensitive material layer 43 already patterned. For example, in case solvent coating method is employed, the solvent employed for dissolving the material of the second photosensitive material layer 45 should preferably not dissolve the first photosensitive material layer 43, consisting of the dissolvable non-crosslinking resist, in which a pattern is already formed. In case the dissolvable pattern is formed by an ordinary positive resist which is generally soluble in polar solvent such as aqueous alkali solution or alcohol, the second photosensitive material layer 45 is preferably non-polar. In case it is coated as solution, there is preferably employed non-polar solvent such as benzene or toluene.

The two-layered structure can also be obtained, even if the photosensitive materials of the upper and lower layers have same or similar properties, by forming a thin coating of a silane coupling agent on the surface of the lower first photosensitive material layer which is already patterned, or by applying a suitable heat treatment to the lower photosensitive material layer 43, or heating the lower photosensitive material layer 43 in an atmosphere containing a silicone compound.

If the dissolvable resist pattern is undesirably affected at the formation of the upper second photosensitive material layer 45 consisting of the thermally crosslinkable positive resist, a preventive measure is preferably applied. For example if the dissolvable pattern is composed of alkali soluble resin and a dissolution inhibitor, the thermal hardening and the gelation of the alkali soluble resin can be prevented by the measures mentioned above. Also the dissolution inhibitor may be soluble also in the non-polar solvent or may cause a trouble of gas generation by decomposition at the thermal crosslinking or at the exposure to light. These drawbacks may be prevented by the selection of a dissolution inhibitor insoluble in non-polar solvent, or the decomposition of the dissolution inhibitor in advance by exposure to light, after the formation of dissolvable pattern.

Then the second photosensitive material layer 45, laminated as explained above and consisting of the thermally crosslinkable positive resist, is crosslinked by heating.

The thermal crosslinking has to be optimized in temperature and time, according to the resin employed, but is generally conducted within a range of 100° C. to 300° C. A lower temperature cannot provide a sufficient crosslinking density or requires a long crosslinking time, while a temperature exceeding 300° C. may cause thermal decomposition or thermal oxidation of the resist, or may generate cracks in the resist film when it is cooled to the room temperature, because of the difference in thermal expansion coefficient between the resist film and the substrate. The heating time has also to be optimized according to the properties of the resist, but is generally within a range of 5 to 120 minutes. The heating may be conducted in an inert atmosphere such as nitrogen or in vacuum in order to prevent, for example, thermal oxidation, though the heating at a low temperature can be conducted in air.

Naturally the crosslinking may be conducted at room temperature, employing two-component crosslinking. Such crosslinking at room temperature is rendered possible by mixing a component A containing an epoxy radical as the crosslinking component in the molecule and another component B containing an amino radical, and applying the obtained mixture onto the substrate. Such two component system is employed for improving the stability in storage at room temperature. However, certain heating is still considered desirable, for the purpose of improving the efficiency of production, for example by the reduction of crosslinking time. Therefore, as described above, the heating temperature has to be optimized according to the material employed.

Figure 18:
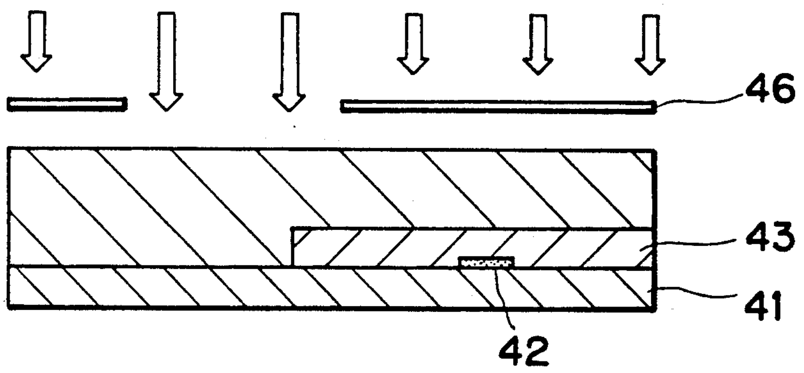
FIG. 18 is a lateral cross-sectional view showing the state of a patternwise exposure to a second photosensitive material layer through a mask, in an embodiment of the head producing method of the present invention.
Figure 19:
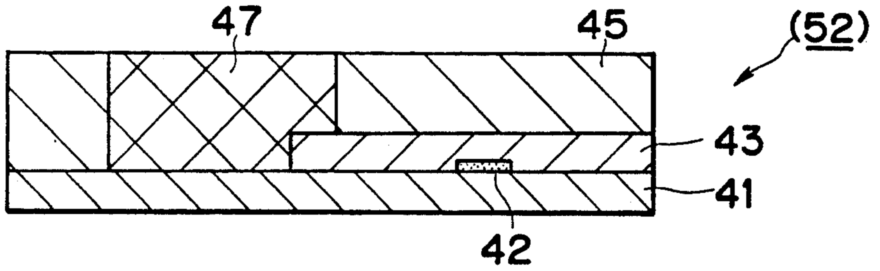
FIG. 19 is a schematic lateral cross-sectional view showing a patternwise latent image of an ink supply opening formed in the second photosensitive material layer, in an embodiment of the head producing method of the present invention.

Then, in the present embodiment, a mask 46 is positioned above the second photosensitive material layer 45 as shown in FIG. 18, and a pattern exposure is conducted with an ionizing radiation, thereby forming a latent image 47 of the ink supply opening, in the second photosensitive material layer 45, as illustrated in FIG. 19. The exposure can be conducted with deep UV light, electron beam, X-ray or excimer laser light. The deep UV light can be obtained from a Xe-Hg lamp, which an ordinary deep UV light source, combined with a cold mirror for 290 and 250 nm. Also the exposure may be conducted by a collective exposure through a mask, a step-and-repeat exposure, or scanning with an electron beam. However, if the resist layer is thick, it may not be exposed uniformly to the light of short wavelength such as deep UV light or excimer laser light, because of absorption in the resist. For example if the molecular structure of the resist contains an aromatic ring, the resist shows an enhanced absorption and does not transmit the light. For this reason there may be required a preventive measure such as the use of resist free from such aromatic ring or the use of an exposure source of a higher penetrating power such as electron beam or X-ray. Though deep UV exposure, capable of collective exposure with a large exposure area, seems best in production efficiency in consideration of the present form of exposure apparatus, the X-ray exposure is best for the freedom of material selection, because of its high penetrating power. The practical use of X-ray exposure will become feasible if the higher intensity of exposure source and the lower cost of mask and exposure apparatus are realized.

Figure 20:
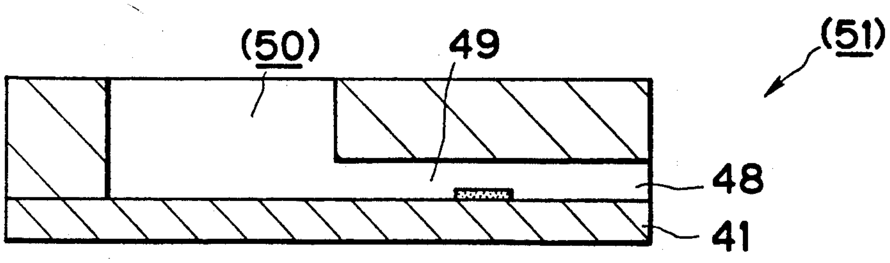
FIG. 20 is a lateral cross-sectional view of a liquid-discharging recording head produced by image development, in an embodiment of the head producing method of the present invention.

According to the present embodiment, a block member 52 obtained as described above is subjected to a development step, in which, as shown in FIG. 20, the latent image 47 of the ink supply opening and the latent images 44 of the ink channel and ink discharge opening, formed in the non-crosslinking resist, are both removed by dissolution. In this manner there is obtained, as shown in FIG. 20, a liquid-discharging recording head 51, provided with ink discharge openings 48, an ink channel 49 and an ink supply opening 50.

The dissolvable resist in the ink channel and ink discharge openings may be simultaneously dissolved out in the development step, or may be dissolved by a suitable solvent after said development step.

In thus produced recording head, the ink supply is rendered possible by coupling an ink supply member to the ink supply opening.

The present embodiment provides following advantages:

(1) The use of thermosetting resin allows to obtain a liquid-discharging recording head of a high mechanical strength and an improved adhesion to the substrate;

(2) The dissolvable resist pattern can be dissolved satisfactorily and within a short time by an organic solvent. The heater elements, electrodes etc. can be prevented from deterioration because of the absence of use of alkaline solution; and (3) Since the thermally crosslinkable positive resist is insoluble in ordinary solvents, the characteristics of the recording head are not deteriorated, because of its structure, even in the use of a longer developing time or a strong developer.

Among various liquid-discharging recording (ink jet recording) methods, the present invention brings about a particularly effect when applied to a recording head of a system utilizing thermal energy for liquid discharge, and a recording apparatus employing such recording head.

The principle and representative configuration of the system are disclosed, for example, in the U.S. Pat. Nos. 4,723,129 and 4,740,796. This system is applicable to so-called on-demand recording or continuous recording, but is particularly effective in the on-demand recording because, in response to the application of at least a drive signal representing the recording information to an electrothermal converter element positioned corresponding to a liquid channel or a sheet containing liquid (ink) therein, the element generates thermal energy capable of causing a rapid temperature increase exceeding the nucleus boiling point, thereby inducing film boiling on a heat action surface of the recording head and thus forming a bubble in the liquid (ink), in one-to-one correspondence with the drive signal. The liquid (ink) is discharged through a discharge opening by the growth and contraction of the bubble, thereby forming at least a liquid droplet. The drive signal is preferably formed as a pulse, as it realizes instantaneous growth and contraction of the bubble, thereby attaining highly responsive discharge of the liquid (ink). Such pulse-shaped drive signal is preferably that disclosed in the U.S. Pat. Nos. 4,463,359 and 4,345,262. Also the conditions described in the U.S. Pat. No. 4,313,124 relative to the temperature increase rate of the heat action surface allows to obtain further improved recording.

The configuration of the recording head is given by the combinations of the liquid discharge openings, liquid channels and electrothermal converter element with linear or rectangular liquid channels, disclosed in the above-mentioned patents, but a configuration disclosed in the U.S. Pat. No. 4,558,333 in which the heat action part is positioned in a flexed area, and a configuration disclosed in the U.S. Pat. No. 4,459,600 also belong to the present invention. Furthermore the present invention is effective in a structure disclosed in the Japanese Patent Laid-Open Application No. 59-123670, having a slit common to plural electrothermal converter elements as a discharge opening therefor, or in a structure disclosed in the Japanese Patent Laid-Open Application No. 59-138461, having an aperture for absorbing the pressure wave of thermal energy, in correspondence with each discharge opening.

A full-line type recording head, capable of simultaneous recording over the entire width of the recording sheet, may be obtained by plural recording heads so combined as to provide the required length as disclosed in the above-mentioned patents, or may be constructed as a single integrated recording head, and the present invention can more effectively exhibit its advantages in such recording head.

The present invention is furthermore effective in a recording head of interchangeable chip type, which can receive ink supply from the main apparatus and can be electrically connected therewith upon mounting on the main apparatus, or a recording head of cartridge type in which an ink cartridge is integrally constructed with the recording head.

Also the recording apparatus is preferably provided with the emission recovery means and other auxiliary means for the recording head, since the effects of the recording head of the present invention can be stabilized further. Examples of such means for the recording head include capping means, cleaning means, pressurizing or suction means, preliminary heating means composed of electrothermal converter element and/or another heating device, and means for effecting an idle ink discharge independent from the recording operation, all of which are effective for achieving stable recording operation.

Furthermore, the present invention is not limited to a recording mode for recording a single main color such as black, but is extremely effective also to the recording head for recording plural different colors or full color by color mixing, wherein the recording head is either integrally constructed or is composed of plural units.

Furthermore, the recording head of the present invention is applicable, not only to liquid ink, but also to ink which is solid below room temperature but softens or liquefies at room temperature, or which softens or liquefies within a temperature control range from 30° to 70° C., which is ordinarily adopted in the ink jet recording. Thus the ink only needs to be liquidous when the recording signal is given. Besides the recording head of the present invention can employ ink liquefied by thermal energy provided corresponding to the recording signal, such as the ink in which the temperature increase by thermal energy is intentionally absorbed by the state change from solid to liquid, or the ink which remains solid in the unused state for the purpose of prevention of ink evaporation, or the ink which starts to solidify upon reaching the recording sheet. In these cases the ink may be supported as solid or liquid in recesses or holes of a porous sheet, as described in the Japanese Patent Laid-Open Applications Nos. 54-56847 and 60-71260, and placed in an opposed state to the electrothermal converter element. The present invention is most effective when the above-mentioned film boiling is induced in the ink of the above-mentioned forms.

Figure 10:
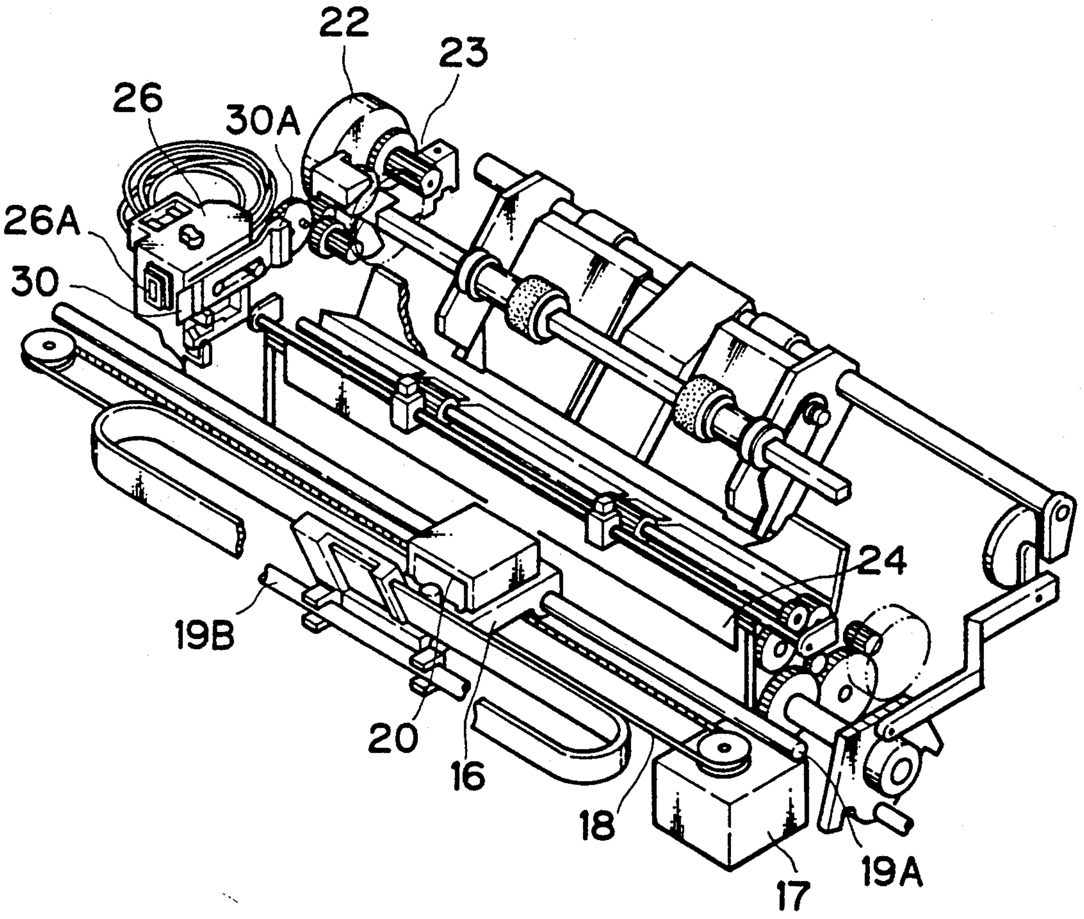
FIG. 10 is a schematic perspective view of a principal part of a liquid-discharging recording apparatus in which-the recording head of the present invention is mountable.

FIG. 10 is an external perspective view of an ink jet recording apparatus (IJRA) in which the liquid-discharging recording head of the present invention is mounted as an ink jet head cartridge (IJC).

Referring to FIG. 10, an ink jet head cartridge (IJC) 20 is provided with a group of discharge openings for effecting ink discharge toward the recording face of a recording sheet fed onto a platen 24. A head carriage (HC) 16, supporting the cartridge 20, is connected to a part of a driving belt 18 which transmits the driving power of a driving motor 17, and is rendered slidable along mutually parallel guide shafts 19A, 19B, thereby allowing the ink jet head cartridge 20 to reciprocate over the entire width of the recording sheet.

A head recovery unit 26 is provided at an end position of the moving path of the cartridge 20, for example at a position opposite to the home position thereof. The recovery unit 26 is activated by a motor 22 through a transmission mechanism 23, thereby capping the ink jet head cartridge 20. In synchronization with the capping of the cartridge 20 by a capping portion 26A of the recovery unit 26, there is conducted ink suction by suitable suction means provided in the recovery unit 26, or ink pressurization by suitable pressurizing means provided in an ink supply path to the cartridge 20, thereby forcedly expel the ink from the discharge openings, thus eliminating the viscosified ink from the nozzles and restoring satisfactory ink discharge. Also the capping at the end of recording operation protects the ink jet head cartridge.

A silicone rubber blade 30, constituting a wiping member, is positioned at a side of the head recovery unit 26. The blade 30 is supported, in a cantilever mechanism, by a blade support member 30a and is activated by the motor 22 and the transmission mechanism 23 in the same manner as the head recovery unit 26, so as to engage with the ink discharge face of the cartridge (IJC) 20. Thus, at a suitable timing in the course of the recording operation of the ink jet head cartridge (IJC) 20, or after the emission recovery operation by the recovery unit 26, the blade 30 is made to protrude into the moving path of the cartridge (IJC) 20, thereby wiping the dew, liquid or dusts on the ink discharge face of the cartridge (IJC) 20 by the movement thereof.

In the following the present invention will be clarified further referring to examples thereof.

EXAMPLE 1

A liquid-discharging recording head of the structure shown in FIG. 7 was prepared according to the process shown in FIGS. 1 to 7.

At first, on a glass substrate 1 provided thereon with electrothermal converter elements (heaters composed of $HfB_2$) constituting the energy generating elements 2, positive resist LP-10 produced by Hoechst was coated with a thickness of 25 μm and baked for 1 hour at 80° C. to form the first photosensitive material layer 3. The above-mentioned positive photoresist consists of a mixture of ordinary novolak resin and naphthoquinonediazide. Then a mask 4, bearing a pattern corresponding to the ink channel, was placed on the resist film, which was contact exposed to light by a Canon PLA-520 mask aligner to form a latent image 6 of the ink channel. The exposure dose was about 200 $mJ/cm^2$ though it was not exactly measured.

Subsequently, on the above-mentioned positive resist film, a photosensitive material layer of a thickness of 25 μm, consisting of a positive dry film OZATEC R255 produced by Hoechst, was laminated to form a second photosensitive material layer 5. A mask 7 bearing patterns corresponding to the ink discharge openings 12 and the ink supply opening 13 was placed on the layer 5, and the layer 5 was irradiated with light in a similar manner as in the lower first layer 3, with an exposure dose of about 100 $mJ/cm^2$.

A block member 10 thus obtained was then immersed in developer (1% aqueous NaOH solution) and developed for ca. 30 minutes under agitation, whereby the ink channel 11, ink discharge openings 12 and ink supply opening 13 were formed. Though dependent on the resist materials used, the positive photoresists after patterning are somewhat deficient in the mechanical strength, solvent resistance and heat resistance. These properties were therefore improved by hardening by deep UV light of a wavelength of 300 nm or shorter and heating. The hardening was conducted for 20 minutes with a 2 KW Xe-Hg lamp made by Ushio Electric Co., and then heating was conducted for 30 minutes at 150° C. The liquid-discharging recording head was finally completed by adhesion of an ink supply connection member 14 to the ink supply opening.

Thus obtained recording head was mounted on a recording apparatus and was used in the recording operation employing ink consisting of pure water/glycerin/Direct Black 154 (water soluble black dye)=65/30/5, and it was proved that the recording head was capable of stable recording operation.

EXAMPLE 2

Electrothermal converter elements were formed on a glass substrate as in the example 1, and an ink supply opening was formed by drilling in the substrate.

Negative electron beam resist OEBR-800 (cyclized polyisoprene resin) supplied by Tokyo Oka Co. was concentrated three times, then coated with a wire bar onto a polyethylene terephthalate film (PET) of a thickness of 25 pm and dried for 30 minutes at 80° C. The obtained resist film had a thickness of 35 μm. The film coated with resist was laminated onto the substrate, and the resist film was transferred thereon by a laminator, at a laminating temperature of 110° C. In this manner there was formed, on the substrate, a resist film which did not sink into the ink supply opening.

The substrate was mounted on an Elionix electron beam writing apparatus ELS-3300, and a pattern of the ink channel was drawn with an electron beam, with a dose of 10 $\mu C/cm^2$.

Then a positive dry film OZATEC R255 was laminated on the first resist layer as in the example 1, and was subjected to the exposure of a pattern of the ink discharge opening, in a Canon mask aligner PLA-501, with an exposure dose of 200 counts.

Subsequently the substrate was immersed in alkaline developer (Hoechst MIF-312) to form the ink discharge openings, and was immersed in toluene to develop the first resist layer. The development of the first resist layer was conducted for 20 minutes, under the application of ultrasonic wave. Then the resist films were hardened with deep UV light as in the example 1.

Finally an ink tank was adhered to the substrate, and the printing operation was conducted with ink supply as in the example 1. The obtained recording head was capable of satisfactory printing.

EXAMPLE 3

As a representative example of the crosslinkable positive resists there will be shown a copolymer of methyl methacrylate, methacrylic acid and methacryl chloride.

At first 60.07 g (0.6 mmol) of methyl methacrylate, 2.61 g (0.03 mmol) of methacrylic acid and 0.25 g of azoisobutyronitrile were dissolved in 90 g of benzene, and the mixture was stirred for 4 hours at 60° C. under nitrogen flow. Then hexane was gradually added to the reaction mixture to obtain viscous white precipitate, which was again dissolved in benzene and reprecipitated from hexane. Finally lyophilization from benzene solution provided white polymer A.

Then methyl methacrylate, methacrylic acid and methacryl chloride were copolymerized (molar ratio 0.52:0.013:0.0013) in the above-explained method to obtain white polymer B. The crosslinkable positive resist was obtained by a mixture of the polymers A and B.

A liquid-discharging recording head of the structure shown in FIG. 7 was prepared according to the process shown in FIGS. 1 to 7.

At first, on a glass substrate provided thereon with the electrothermal converter element (heater composed of $HfB_2$) constituting the energy generating element, solution of the crosslinkable positive resist (20 wt. % solution of a mixture of the polymers A and B dissolved in an 8:2 mixture of chlorobenzene and dichloromethane) was coated as the first photosensitive material layer, and dried for 1 hour at 80° C., with a thickness of 25 μm after drying.

The obtained resist layer was heated, together with the substrate, for 15 minutes at 200° C., thus causing crosslinking reaction in the resist. At this point the first photosensitive material layer was rendered insoluble in the developer. A mask bearing a pattern of the ink channel was placed in contact with the crosslinked position resist film, which was then exposed to light through the mask, in a Canon PLA-520 mask aligner, with a dose of about 80 mJ/cm$^2$. In the exposed area, the polymer chain was decomposed so that the area was rendered soluble in developer in a subsequent developing step.

Then, crosslinkable positive resist synthesized in a similar manner as described above (a mixture of ethyl methacrylate/methacrylic acid copolymer [molar ratio 20/1] and ethyl methacrylate/methacrylic acid/methacryl chloride copolymer [molar ratio 40/10/1]) was formed as a dry film (thickness 20 μm), laminated as the second photosensitive material layer on the above-mentioned positive resist film, and heated for 15 minutes at 180° C. A mask bearing a pattern of the ink discharge openings and ink supply opening was placed on the second photosensitive material layer, which was then exposed to light in a similar manner as the first photosensitive material layer, with an exposure dose of about 70 mJ/cm$^2$.

Subsequently the substrate was immersed in developer (methylisobutylketone) and was developed for about 30 minutes under agitation to form the ink channel, ink discharge openings and ink supply opening. A post-heating may be applied for further increasing the crosslinking density. The recording head was completed by finally adhering an ink supply member to the ink supply opening. The liquid-discharging recording head, obtained in this manner, was formed by crosslinked polymer and showed excellent mechanical strength, solvent resistance and heat resistance.

The recording head was capable of stable printing, when it was mounted on a recording apparatus and subjected to a recording operation utilizing ink consisting of pure water/glycerin/Direct Black 154 (water-soluble black dye)=65/30/5.

In a recording test for 6 months on a recording apparatus, the recording head did not show any unstable ink discharge resulting from precipitate in the ink or from blocking of discharge openings, was capable of stable printing and completely free from deformation of said openings.

EXAMPLE 4

A liquid-discharging recording head of the structure shown in FIG. 7 was prepared by a process shown in FIGS. 1 to 7.

At first, on a glass substrate provided thereon with electrothermal converter elements (heaters composed of $HfB_2$) constituting the energy generating elements, a 20 wt. % solution of methacrylic acid-methyl methacrylate copolymer (molar ratio=2:8, crosslinking temperature=215.8° C., see FIG. 1) dissolved in an 8:2 mixture of chlorobenzene and dichloromethane was coated as the first photosensitive material layer (thermally crosslinkable positive resist), and was dried for 1 hour at 80° C. to obtain a thickness of 25 μm after drying.

The resist film was heated, together with the substrate, for 15 minutes at 220° C. to cause crosslinking reaction in the resist. At this point the first crosslinkable positive resist layer was rendered insoluble in developer. Then a mask bearing a pattern of the ink channel was placed on the crosslinked positive resist film, which was then contact exposed to light in a Canon PLA-520 mask aligner, with an exposure dose of about 120 mJ/cm$^2$. Because of decomposition of polymer chains by exposure, the exposed area became soluble in developer in the subsequent developing step.

Figure 12:
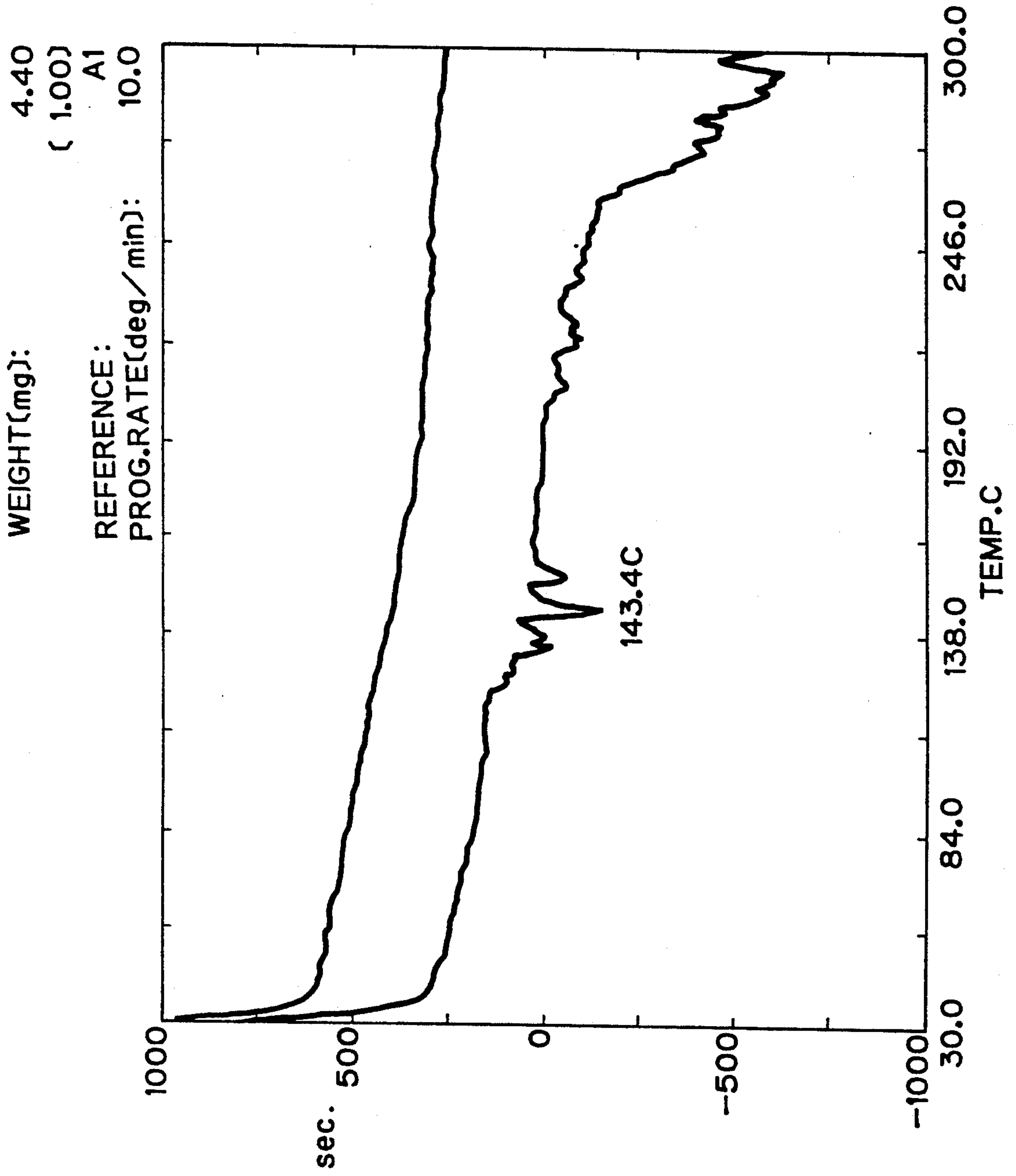

Then, on the first photosensitive material layer, a 20 wt. % solution of n-butyl methacrylate/methacrylic acid/methacryl chloride copolymer (molar ratio=40/10/1, crosslinking temperature 143.4° C., see FIG. 12) dissolved in n-butanol was coated as the second photosensitive material layer (crosslinkable positive resist) and was dried for 1 hour at 80° C. to obtain a thickness of 20 μm after drying. The second photosensitive material layer was heated for 15 minutes at 170° C. ($T_2$=170° C.), then a mask bearing a pattern corresponding to the ink discharge openings and ink supply opening was placed on the second layer, and the layer was exposed to light in the same manner as the first photosensitive material layer, with an exposure dose of about 100 mJ/cm$^2$.

Subsequently said substrate was immersed in developer (methylisobutylketone) and subjected to the development of the first and second photosensitive material layers for about 30 minutes under agitation, whereby the ink discharge openings, ink supply opening and ink channel were formed. The first and second photosensitive material layers could be developed without residue. The liquid-discharging recording head was completed by finally attaching an ink supply member to the ink supply opening.

The recording head was capable of stable printing operation, when it was mounted on a recording apparatus and used in recording, utilizing ink consisting of pure water/glycerin/Direct Black 154 (water soluble black dye)=65/30/5.

Also in a recording test for 6 months on a recording apparatus, the recording head did not show any unstable ink discharge resulting from precipitation into the ink or from block of discharge openings, was capable of stable printing and was completely free from deformation of said openings.

EXAMPLE 5

A liquid-discharging recording head was prepared in a similar manner as in the example 4, except that the first photosensitive material layer was composed of methyl methacrylate/methacrylic acid copolymer ( molar ratio 10/1; crosslinking temperature 183° C.; heated for 15 minutes at 200° C.), and that the second photosensitive material layer was composed of n-butyl methacrylate/methacrylic acid copolymer (molar ratio 20/1; crosslinking temperature 152.1° C.; heated for 20 minutes at 165° C.). The second layer was formed as a dry film and laminated on the first layer.

In a recording test for 6 months on a recording apparatus, the recording head did not show any unstable ink discharge resulting from precipitation into the ink or from blocking of discharge openings, was capable of stable printing and was completely free from deformation of the discharge opening.

EXAMPLE 6

At first thermally crosslinkable positive resist was synthesized in the following manner.

Methyl methacrylate and glycidyl methacrylate were respectively vacuum distilled. Then 80 parts by weight of methyl methacrylate and 23.4 parts of glycidyl methacrylate ( 20 mol. % ) were dissolved in 100 parts of tetrahydrofurane, then were added with 0.5 parts of azobisisobutyronitrile (AIBN), and radical polymerization was conducted under agitation for 5 hours at 60° C. The reaction mixture was then drown in 1000 parts of cyclohexane to collect the resin. The collected resin was again dissolved in 200 parts of tetrahydrofurane, then reprecipitated by drowning in 1000 parts of cyclohexane, and washed. After drying in vacuum for an entire day at 60° C., the resin was dissolved in cyclohexanone at a concentration of 25 wt. %. Resist solution was obtained by adding 0.1 parts of 10 wt. % cyclohexanone solution of triethylenetetramine based on 100 parts of the resin solution.

A liquid-discharging recording head of the structure shown in FIG. 7 was prepared according to the process shown in FIGS. 1 to 7. At first, on a glass substrate provided thereon with electrothermal converter elements (heaters composed of $HfB_2$) constituting the energy generating elements, the above-mentioned resist solution was coated with a wire bar of #60, and dried for 30 minutes at 80° C. The obtained resist film was hardened for 10 minutes at 120° C., and had a thickness of 30 μm.

Then the resist film was subjected to the contact exposure of a pattern of ink channel, with a 2 KW deep UV Xe-Hg lamp made by Ushio Electric Co. The exposure was conducted for 10 minutes, with a dose of 60 $J/cm^2$.

Then, on the above-mentioned film, a film the resist was formed by lamination. At first the resist solution was coated with a wire bar of #70 on an aramide film of a thickness of 25 μm (supplied by toray Co. ), and dried for 30 minutes at 80° C. Then the coated film was maintained in contact with the substrate, and transferred thereto with a laminator. The lamination was conducted at a temperature of 100° C. and a pressure of 1 $kg/cm^2$. After the transfer, the resin film was crosslinked by heating for 10 minutes at 120° C. The upper resist film had a thickness of 20 μm.

The upper resist film was subjected to the exposure of a pattern of the ink discharge openings in a similar manner as described above. The exposure was conducted for 10 minutes.

Subsequently the resist films were developed with developer consisting of a mixture of methylisobutylketone and ethyl alcohol with a volume ratio of 1:2. After the development, the resist films were cured by heating for 1 hour at 80° C.

The liquid-discharging recording head was completed by finally adhering an ink supply connection member 10 and making electrical connections. The obtained recording head was capable of stable printing, when it was mounted on a recording apparatus of the structure shown in FIG. 10 and used in a recording operation, employing ink consisting of pure water/glycerin/Direct Black 154 (water soluble black dye)=65/30/5.

EXAMPLE 7

Synthesis, washing and drying of resin were conducted, as the example 6, by mixing 72 parts of distilled methyl methacrylate, 28 parts of glycidyl methacrylate, and 8 parts of methacrylic acid in 100 parts of tetrahydrofurane and adding 0.5 parts of AIBN thereto. Resist solution was prepared by dissolving the obtained resin in diacetone alcohol at a concentration of 25 wt. %, and adding diethylaminopropylamine of 0.5 wt. %.

On the glass substrate used in the example 6, provided thereon with the electrothermal converter elements, a penetrating hole for ink supply was formed with a diamond drill of 300 μmϕ, in a position constituting a part of the ink channel in the vicinity of the electrothermal converter elements. A film of the resist was formed on the substrate by lamination, in a similar manner as in the example 6. The obtained film was crosslinked by baking for 30 minutes at 120° C., and had a thickness of 30 μm.

The resist film was exposed to a pattern of the ink channel by means of an electron beam. The exposure was conducted with a dose of 200 $\mu C/cm^2$ on an Elionix electron beam writing apparatus ELS-3300. On the resist film, there was formed a film of the resist synthesized in the example 6 by lamination, and baked for 10 minutes at 120° C. The thickness of thus obtained resist film was 20 μm. The substrate was again mounted on the electron beam writing apparatus, and was subjected to the exposure of a pattern of the ink discharge openings, with an exposure dose of 150 $C/cm^2$. Subsequently the first resist film was developed with a 1:3 mixture of methylisobutylketone and diethylene glycol, then the second resist film was developed with a 1:2 mixture of methylisobutylketone and ethyl alcohol, and the films were cured by heating for 1 hour at 80° C.

A piece of sponge was placed in an ink tank molded with acrylic resin, and the ink used in the example 6 was filled therein. Then the ink tank was adhered, with epoxy adhesive (Araldite supplied by 3M Co. ), in a position on the rear face of the substrate, capable of ink supply to the ink supply opening. Also electric wiring was formed for supplying the electrothermal converter elements with electric signals.

The above-explained liquid-discharging recording head was capable of stable recording, when it was mounted on a recording apparatus shown in FIG. 10 and was used in a recording operation.

EXAMPLE 8

As a representative crosslinkable positive resist, copolymer of methyl methacrylate, methacrylic acid and methacryl chloride was synthesized.

At first 60.07 g (0.6 mol.) of methyl methacrylate, 2.61 g (0.03 mmol.) of methacrylic acid and 0.25 g of azoisobutyronitrile were dissolved in 90 g of benzene and stirred for 4 hours at 60° C. under a nitrogen flow. Then hexane was gradually added to the reaction mixture to obtain white viscous precipitate. The precipitate was dissolved again in benzene, then reprecipitated with hexane, and finally lyophilyzed from benzene solution to obtain white polymer A. The methyl methacrylate, methacrylic acid and methacryl chloride were copolymerized in the above-explained manner, with a molar ratio of 0.52:0.013:0.0013 to obtain white polymer B. Crosslinkable positive resist was prepared by mixing the polymers A and B.

Then a liquid-discharging recording head was prepared of the structure shown in FIG. 7, according to the process shown in FIGS. 1 to 7.

At first, on a glass substrate provided thereon with electrothermal converter elements (heaters composed of $HfB_2$) constituting the energy generating elements, solution of the crosslinkable positive resist (20 wt. % solution of a mixture of the polymers A and B in equal amounts, dissolved in an 8:2 mixture of chlorobenzene and dichloromethane) was coated as the first photosensitive material layer, and was dried for 1 hour at 80° C. to obtain a film with a thickness after drying of 25 μm. Then the film, together with the substrate, was heated for 15 minutes at 200° C. to crosslink the resist. At this point the first photosensitive material layer is rendered insoluble in developer. Then a mask bearing a pattern of the ink channel was placed on the crosslinked positive resist film, and contact exposure was conducted with a Canon PLA-520 mask aligner, with an exposure dose of 80 $mJ/cm^2$. The polymer chains were decomposed in the exposed area, which thus became soluble in developer in a subsequent developing step.

Then, on the positive resist film, the second photosensitive material layer was formed by laminating a positive resist dry film OZATEC R255, supplied by Hoechst, with a thickness of 25 μm. A mask bearing a pattern of the ink discharge openings and ink supply opening was placed on the second layer, and optical exposure was conducted in the same manner as for the first photosensitive material layer, however, with the light of a wavelength of 300 nm or longer, obtained through a cold mirror. The exposure dose to the second layer was about 100 $mJ/cm^2$.

Subsequently the substrate was immersed in developer (1% aqueous NaOH solution), and the second photosensitive material layer was developed for about 30 minutes under agitation to form the ink discharge openings and the ink supply opening. Then the substrate was immersed in toluene, and the first photosensitive material layer was developed for about 30 minutes under agitation to form the ink channel. Though dependent on the employed resist material to some extent, the positive resist constituting the second photosensitive material layer is deficient in the mechanical strength, solvent resistance and heat resistance after heating, so that these properties were improved by heating for 30 minutes at 150° C. The liquid-discharging recording head was completed by finally fitting an ink supply member to the ink supply opening.

The recording head was capable of stable printing, when it was mounted on a recording apparatus and was used in a recording operation with ink consisting of pure water/glycerin/Direct Black 154 (water soluble black dye)=65/30/5.

In a recording test for 6 months on a recording apparatus, the recording head did not show any unstable ink discharge resulting from precipitate in the ink or from blocking of discharge openings, was capable of stable printing and was completely free from deformation of the discharge openings.

EXAMPLE 9

In the example 8, the second photosensitive material layer was replaced by a film of a thickness of 25 μm, obtained by lamination of a dry film prepared by adding 5 wt. % of 4,4'-diazidocalcon to cyclized polyisoprene resist OEBR-800 supplied by Tokyo Oka Industries Co. The second photosensitive material layer was negative type resist, and the exposure was conducted in the same manner as in the example 8, except the use of a mask bearing a negative pattern corresponding to the ink discharge openings and the ink supply opening. Subsequently the liquid-discharging recording head was prepared in the same manner as in the example 8, except that toluene was used as the developer for the second layer.

In a recording test for 6 months on a recording apparatus, the recording head did not show any unstable ink discharge resulting from precipitate in the ink or from blocking of discharge openings was capable of stable printing and was completely free from deformation of the openings.

EXAMPLE 10

The present example employed photosensitive materials (resists) of mutually different photosensitive spectral regions. The lower first photosensitive material layer consisted of resist sensitive to an electron beam, while the upper second photosensitive material layer consisted of resist sensitive to ultraviolet light of a wavelength of 300 nm.

A liquid-discharging recording head of the structure shown in FIG. 7 was prepared according to a process shown in FIGS. 1 to 7.

At first, on a glass substrate, provided thereon with electrothermal converter elements (heaters composed of $HfB_2$) constituting the energy generating elements, negative resist consisting of chloromethylated polystyrene (CMS-EX supplied by Tohso Co. ) was coated with a thickness of 25 μm, and was baked for 1 hour at 80° C. Then the substrate was mounted on an Elionix electron beam drawing apparatus ELS-3300, and the patterning of the ink channel was conducted under an acceleration voltage of 30 kV and a radiation dose of 40 $\mu C/cm^2$.

Separately resist was prepared by dissolving polyvinylphenol (Resin-M supplied by Maruzen Petrochemical Co.), added with a 5% amount of 4,4'-diazidocalcon (A-013 supplied by Shinko Giken Co.), in n-butyl alcohol, and filtering the obtained solution with a 0.22 μm filter. This resist solution was spin coated on the CMS resist, so as to obtain a thickness of 20 μm, and was prebaked for 30 minutes at 80° C. A mask bearing a pattern of the ink discharge openings and ink supply opening was placed on thus formed layer, to which contact exposure was given by a Canon mask aligner PLA-520 modified for the deep UV light. The reflecting mirror used was for a wavelength of 290 nm, and the exposure dose was about 800 $mJ/cm^2$.

Subsequently the substrate was immersed in alikaline developer (MIF-312 supplied by Hoechst) for 10 minutes to form the ink discharge openings and the ink supply opening, and then was immersed in developer (toluene) for CMS-EX resist for 30 minutes with the application of ultrasonic wave, to form the ink channel. Since the resists after patterning were deficient in the mechanical strength, solvent resistance and heat resistance, these properties were improved by hardening with the deep UV light of 300 nm or shorter, and by heating. The hardening was conducted for 20 minutes with the light from a 3 KW Xe-Hg lamp made by Ushio Electric co., and then the heating was conducted for 30 minutes at 150° C.

The liquid-discharging recording head was completed by finally adhering an ink supply member to the ink supply opening.

The recording head thus prepared was capable of stable printing, when it was mounted on a recording apparatus and used in a recording operation with ink consisting of pure water/glycerin/Direct Black 154 (water soluble black dye)=65/30/5.

EXAMPLE 11

This example employed same negative working resist for the upper and lower resist layers.

As in the example 10, the substrate was coated, as the lower resist layer, with the cyclized polyisoprene resist (OEBR supplied by Tokyo Oka Industries Co.), added with a 2 wt. % amount of the bisazide compound employed in the example 10 (4,4'-diazidocalcon), with a thickness of 25 μm. As in the example 10, the resist layer was exposed to a pattern of the ink channel, by means of ultraviolet light of 300 nm, with an exposure dose of 800 $mJ/cm^2$.

Separately, same solution as that for the lower resist layer, containing however the hisazide compound in 10 wt. %, was coated with a bar coater with a thickness of 20 μm on a polyethylene terephthalate film of a thickness of 100 μm. After the coated film was prebaked for 1 hour at 80° C. and in vacuum for removing the solvent, it was transferred by lamination on the substrate, bearing thereon the already patterned lower resist layer. The lamination was conducted at a temperature of 120° C. and a pressure of 10 $kg/cm^2$.

Then thus formed resist film was subjected to the exposure under same conditions as those for the lower resist film. The exposure dose was 100 $mJ/cm^2$, at which the lower resist layer did not cause gelation.

After the exposure, the substrate was developed for 20 minutes in toluene, and rinsed for 5 minutes in isopropyl alcohol. Subsequently UV hardening was conducted as in the example 10. The liquid-discharging recording head was completed by finally adhering an ink supply member to the ink supply opening. The recording head thus prepared was capable of stable printing, when it was mounted on a recording apparatus and used in a recording operation employing ink consisting of pure water/glycerin/Direct Black 154 (water soluble black dye)=65/30/5.

EXAMPLE 12

This example employed the photosensitive resin materials of different sensitivities for the upper and lower layers.

Acrylate prepolymer Aronix M-312 supplied by Toa Gosei Kagaku Co. and acrylic resin Elvacite 204I supplied by DuPont were mixed in a ratio of 70:30 and were dissolved in ethyl acetate. Two solutions were prepared from the above-mentioned solution, by adding respectively 3 parts of 2-chlorothioxanthone (supplied by Tokyo Kasei Shiyaku Co. ) based on the solid content, or 3 parts of 2-chlorothioxanthone and 2 parts of ethyl p-dimethylaminobenzoate. Each of these solutions was coated with a bar coater so as to obtain a thickness of 30 μm on an aramide film (supplied by Toray Co.) of a thickness of 20 μm, and the obtained film was laminated onto the glass substrate and subjected to the sensitivity measurement on a Mikasa mask aligner MA-10. The system containing ethyl p-dimethylaminobenzoate showed a sensitivity which was 5 times of that of the system not containing the compound. More specifically, the amine-containing system showed a film thickness of 18 μm after toluene development in response to an exposure time of 20 seconds, while the amine-free system showed a same film thickness in response to an exposure time of 100 seconds.

The above-mentioned photosensitive resin, not containing amine, was laminated onto the substrate in the same manner as in the example 10, and was subjected to the exposure of a pattern of the ink channel by the light from a high-pressure mercury lamp in the mask aligner, with an exposure time of 150 seconds.

Then the aramide film on the resist surface was peeled off, an amine-containing resist film was laminated in a similar manner, and exposure of a pattern of the ink discharge openings and the ink supply opening was conducted, with an exposure time of 20 seconds. After the aramide film on the resist surface was peeled off, the resist layers were developed with toluene for 20 minutes. After the development, a hardening exposure was conducted for 10 minutes, followed by heating at 120° C. Thereafter the recording head was prepared in the same manner as in the example 10. The obtained recording head was capable of stable recording.

EXAMPLE 13

A liquid-discharging recording head of the structure shown in FIG. 20 was prepared according to a process shown in FIGS. 13 to 20.

At first, on a silicon substrate 41 provided thereon with electrothermal converter elements (heaters composed of $HfB_2$) constituting energy generating elements 42, a dissolvable non-crosslinking resist pattern 43 was formed, for defining the ink channel and the ink discharge openings.

The resist, consisting of polymethacrylamide FMR-100 supplied by Fuji Photo Film Co., was coated with a bar coater so as to obtain a thickness of 25 μm and prebaked for 10 minutes at 90° C. Exposure was conducted with the light reflected .by a cold mirror for 250 nm, in a Canon mask aligner PLA-501FA modified for the deep UV exposure, with an exposure dose of 1000 $mJ/cm^2$. Development was conducted with developer MIF-312 (supplied by Hoechst), diluted to 1.5 times with DI water.

On the resist pattern 44, thermally crosslinkable positive resist 45 was coated by a bar coater with a thickness of 50 μm, in the following manner.

A 20% solution of methyl methacrylatemethacrylic acid copolymer (80:20) (supplied by Polyscience Co.) dissolved in 1:1 mixture of cyclohexanone and 1,4-dioxane was coated with a wire bar of #70. After removal of solvent by heating for 1 hour at 80° C., thermal hardening was conducted for 1 hour at 200° C. The obtained film had a thickness of 60 μm, and was insoluble in any solvent.

Then the substrate was contact exposed to the deep UV light through a mask 46 bearing a pattern of the ink channel, on an irradiation apparatus utilizing a 2 KW Xe-Hg lamp supplied by Ushio Electric Co., with an exposure time of 10 minutes and an exposure dose of 120 $J/cm^2$.

After cutting with a dicing saw, the substrate was developed for about 3 minutes under agitation in 1,4-dioxane, thereby forming the ink discharge openings 48, ink supply opening 50 and ink channel 49.

Subsequently it was immersed in developer MIF-312 for 30 minutes, in order to dissolve the pattern consisting of the resist FMR-100, thereby completing the liquid-discharging recording head 51.

Finally the recording head was obtained by adhering an ink supply member to the ink supply opening.

The recording head thus prepared was capable of stable printing, when it was mounted on a recording apparatus shown in FIG. 10 and was used in a recording operation with ink consisting of pure water/glycerin/-Direct Black 154 (water soluble black dye)=65/30/5.

Also the thermosetting resin, constituting the ink channel, showed satisfactory adhesion, over the entire area, to the substrate.

EXAMPLE 14

As in the example 13, a dissolvable non-crosslinking resist pattern was formed to define the ink channel, on a substrate provided with the electrothermal converter elements. The pattern was formed by an image reversal process, in order to improve the solvent resistance and heat resistance of the resist pattern.

The resist consisted of AZ-4903 supplied by Hoechst, and was coated with a spin coater so as to obtain a thickness of 25 μm. After prebaking for 10 minutes at 90° C., it was subjected to a patternwise exposure on a Canon mirror projection aligner MPA-600 FAb, with an exposure dose of 200 counts. After baked for 30 minutes at 90° C., the substrate was flush illuminated on a Canon mask aligner PLA-520FA. Thereafter pattern was formed by development with MIF-312 developer.

Subsequently, on the pattern, there was formed a film of methyl methacrylate-glycidyl methacrylate copolymer, which was synthesized in the following manner.

The copolymer was synthesized by dissolving 200 ml of distilled methyl methacrylate (Kishida Chemical Reagent Co. ) and 30 ml of glycidyl methacrylate (Kishida Chemical Reagent Co. ) in 300 ml of benzene, then adding 1 g of N,N'-azobisisobutyronitrile (Kishida Chemical Reagent Co. ) as polymerization initiator, and stirring the mixture for 4 hours at 60° C. Resin was collected by drowning the reaction mixture into 500 ml of cyclohexane, then dried and dissolved in toluene at a concentration of 20 wt. %, to obtain copolymer solution. Since the resin is crosslinked thermally by the epoxy radical, tetraethylenetetramine (Kishida Chemical Reagent Co. ) was added as amine at a concentration of 0.5% immediately before coating.

The solution was coated with a bar coater onto the substrate, and the resin was cured by baking for 20 minutes at 100° C. the obtained film had a thickness of 60 μm.

The patterned exposure, substrate cutting and pattern development of the ink channel and the ink supply opening were conducted in the same manner as in the example 13, utilizing a deep UV irradiating apparatus supplied by Ushio Electric Co. The irradiation dose and developing conditions were same as those in the Example 13.

Subsequently the ink channel was formed by dissolution of positive resist, by immersion in isopropyl alcohol.

After fitting of an ink supply member as in the example 13, the recording head was capable of satisfactory printing, and the thermosetting resin constituting the nozzles was satisfactorily adhered to the substrate.

The effects of the present invention explained above are listed below as representative ones:

1) As the main process steps for head preparation are conducted by a photolithographic process utilizing photoresist, the fine structure of the head can be extremely easily formed with a desired pattern, and a plurality of heads of a same structure can be easily produced at the same time;

2) Formation of discharge openings does not necessarily require a cutting step, and the distance between the energy generating element and the ink discharge opening can be controlled by the thickness of a resist film. It is therefore rendered possible to produce, in stable manner, recording heads having a constant distance between the energy generating element and the discharge opening and smooth internal faces of the discharge openings, thereby improving the yield of head production and the print quality;

3) Recording heads of a high dimensional precision can be produced with a high production yield, since main constitutional members can be aligned in easy and secure manner;

4) Head manufacture is possible with at least two resist coating and exposing steps and one developing step, and an improvement in the production efficiency and a reduced investment in equipment can be realized from a shortened production process;

5) A high-density multi-discharge opening recording head can be obtained in a simple manner;

6) Change and control of design are easily attained, since the height of the ink channel and the diameter of the ink discharge openings can be simply and accurately modified by the thickness of the resist film; and 7) Since the fine structures do not need adhesion with an adhesive material, the recording head is protected from deterioration of performance, resulting from eventual blocking of the ink channel and/or the ink discharge opening by the adhesive material.

What is claimed is:

1. A method for producing a liquid discharging recording head including an ink discharge opening, an ink supply opening, an ink channel communicating with said ink discharge opening and said ink supply opening, and an energy generating element provided corresponding to said ink channel and adapted for generating energy to be utilized for ink discharge, comprising the steps of:

forming a first photosensitive material layer for ink channel formation, on a substrate bearing thereon said energy generating element;

pattern exposing said first photosensitive material layer for forming the ink channel;

forming a second photosensitive material layer on said first photosensitive material layer in which a latent image of the ink channel is patterned;

pattern exposing said second photosensitive material layer for forming the ink discharge opening and the ink supply opening; and developing said first photosensitive material layer and said second photosensitive material layer.

2. A method for producing a liquid discharging recording head including an ink discharge opening, an ink channel communicating with said ink discharge opening, and an energy generating element provided corresponding to said ink channel and adapted for generating energy to be utilized for ink discharge, comprising steps of:

forming a first photosensitive material layer for ink channel formation, on a substrate bearing thereon said energy generating element and provided therein with an ink supply opening;

pattern exposing said first photosensitive material layer for forming the ink channel;

forming a second photosensitive material layer on said first photosensitive material layer in which a latent image of the ink channel is patterned;

pattern exposing said second photosensitive material layer for forming the ink discharge opening; and developing said first photosensitive material layer and said second photosensitive material layer.

3. A liquid-discharging recording head produced by a method according to claim 1 or 2.

4. A liquid-discharging recording head according to claim 3, wherein said energy generating element is an electrothermal transducer adapted to generate thermal energy as the energy.

5. A liquid-discharging recording head according to claim 3, formed as a full-line type head having plural ink discharge openings, arranged over an entire width of a recording area of a recording medium.

6. A liquid-discharging recording apparatus comprising:

a liquid-discharging recording head according to claim 3, having the ink discharge opening in opposed relationship to a recording face of a recording medium; and a member for supporting said recording head.

7. A method for producing a liquid discharging recording head including an ink discharge opening, an ink supply opening, an ink channel communicating with said ink discharge opening and said ink supply opening, and an energy generating element provided corresponding to said ink channel and adapted for generating energy to be utilized for ink discharge, comprising the steps of:

A) forming a first photosensitive material layer for ink channel formation, composed of a thermally crosslinkable positive resist on a substrate bearing thereon said energy generating element, thermally crosslinking said resist, and pattern exposing said crosslinked first photosensitive material layer by an ionizing radiation for forming the ink channel;

B) forming a second photosensitive material layer composed of thermally crosslinkable positive resist on said exposed first photosensitive material layer, thermally crosslinking said second photosensitive material layer, and pattern exposing said crosslinked second photosensitive material layer by an ionizing radiation for forming the ink discharge opening and the ink supply opening; and C) developing the latent images formed by the pattern exposures in said first photosensitive material layer and said second photosensitive material layer;

wherein said steps A, B and C are conducted in successive order.

8. A method for producing a liquid-discharging recording head including an ink discharge opening, an ink channel communicating with said ink discharge opening, and an energy generating element provided corresponding to said ink channel and adapted for generating energy to be utilized for ink discharge, comprising the steps of:

A) forming a first photosensitive material layer for ink channel formation, composed of a thermally crosslinkable positive resists on a substrate bearing thereon said energy generating element, and provided therein with an ink supply opening thermally crosslinking said resist, and pattern exposing said crosslinked first photosensitive material layer by an ionizing radiation for forming the ink channel;

B) forming a second photosensitive material layer composed of thermally crosslinkable positive resists on said exposed first photosensitive material layer, thermally crosslinking said second photosensitive material layer, and pattern exposing said crosslinked second photosensitive material layer by an ionizing radiation for forming said ink discharging opening; and C) developing the latent images formed by the pattern exposures in said first photosensitive material layer and said second photosensitive material layer;

wherein said steps A, B and C are conducted in successive order.

9. A liquid-discharging recording head produced by a method according to claim 7 or 8.

10. A liquid-discharging recording head according to claim 9, wherein said energy generating element is an electrothermal transducer for generating thermal energy as the energy.

11. A liquid-discharging recording head according to claim 9, constructed as a full-line type head having a plurality of ink discharge openings arranged over the entire width of a recording area of a recording medium.

12. A liquid-discharging recording apparatus comprising:

a liquid-discharging recording head according to claim 9, having the ink discharge opening in opposed relationship to a recording face of a recording medium.

13. A method for producing a liquid-discharging recording head including an ink discharge opening, an ink supply opening, an ink channel communicating with said ink discharge opening and said ink supply opening, and an energy generating element provided corresponding to said ink channel and adapted for generating energy to be utilized for ink discharge, comprising the steps of:

A) forming a first photosensitive material layer for ink channel formation, composed of a thermally crosslinkable positive resist on a substrate bearing thereon said energy generating element, thermally crosslinking said resist, and pattern exposing said crosslinked first photosensitive material layer by an ionizing radiation for forming the ink channel;

B) forming a second photosensitive material layer composed of thermally crosslinkable positive resist on said exposed first photosensitive material layer, thermally crosslinking said second photosensitive material layer at a crosslinking temperature not exceeding that of the first photosensitive material layer, and pattern exposing said crosslinked second photosensitive material layer by an ionizing radiation for forming the ink discharge opening and the ink supply opening; and C) developing the latent image formed by the pattern exposure in said first photosensitive material layer and said second photosensitive material layer;

wherein said steps A, B and C are conducted in successive order.

14. A method for producing a liquid-discharging recording head including an ink discharge opening, an ink channel communicating with said ink discharge opening, and an energy generating element provided corresponding to said ink channel and adapted for generating energy to be utilized for ink discharge, comprising the steps of:

A) a forming a first photosensitive material layer for ink channel formation, composed of a thermally crosslinkable positive resist on a substrate bearing thereon said energy generating element, and provided therein with an ink supply opening, thermally crosslinking said resist, and pattern exposing said crosslinked first photosensitive material layer by an ionizing radiation for forming the ink channel;

B) forming a second photosensitive material layer composed of thermally crosslinkable positive resist on said exposed first photosensitive material layer, thermally crosslinking said second photosensitive material layer at a crosslinking temperature not exceeding that of the first photosensitive material layer, and pattern exposing said crosslinked second photosensitive material layer by an ionizing radiation for forming the ink discharge opening and the ink supply opening; and C) developing the latent images formed by the pattern exposures in said first photosensitive material layer and said second photosensitive material layer;

wherein said steps A, B and C are conducted in successive order.

15. A liquid-discharging recording head produced by a method according to claim 13 or 14.

16. A liquid-discharging recording head according to claim 15, wherein said energy generating element is an electrothermal transducer for generating thermal energy as the energy.

17. A liquid-discharging recording head according to claim 15, constructed as a full-line type head having a plurality of ink discharge openings arranged over an entire width of a recording area of a recording medium.

18. A liquid-discharging recording apparatus comprising:

a liquid-discharging recording head according to claim 15, having the ink discharge opening in opposed relationship to a recording face of a recording medium; and a member for supporting said recording head.

19. A method for producing a liquid-discharging recording head, comprising:

a first step of forming a first positive crosslinkable photosensitive material layer containing an epoxy group on a substrate bearing thereon an element for generate energy for ink discharge, thermally crosslinking said first positive photosensitive material layer, and exposing said thermally crosslinked first positive photosensitive material layer to light, thereby forming a latent image of a liquid channel;

a second step of forming a second positive crosslinkable photosensitive material layer containing an epoxy group on the first positive photosensitive material layer having the latent image therein, thermally crosslinking said second positive photosensitive material layer, and exposing said crosslinked second positive photosensitive material layer to light thereby forming a latent image of a liquid discharge opening; and a third step of developing said first positive photosensitive material layer and said second positive photosensitive material layer having the latent images therein, thereby forming the liquid channel and the liquid discharge opening.

20. A method for producing a liquid-discharging recording head according to claim 19, wherein said positive photosensitive material layers are composed of a polymer compound in which glycidyl methacrylate is copolymerized in an amount of 5 to 80 mol. %.

21. A liquid-discharging recording head produced by a method according to claim 19 or 20.

22. A liquid-discharging recording head according to claim 21, wherein said element for generating energy for ink discharge is an electrothermal transducer adapted for generating heat in response to electric energy, thereby causing a state change in the ink to induce discharge thereof.

23. A liquid-discharging recording head according to claim 21, constructed as a full-line type head having a plurality of liquid discharge openings arranged over an entire width of a recording area of a recording medium.

24. A recording apparatus comprising:

a recording head according to claim 21, having the ink discharge opening in opposed relationship to a recording face of a recording medium; and a member for supporting said recording head.

25. A method for producing a liquid-discharging recording head including an ink discharge opening, an ink supply opening, an ink channel communicating with said ink discharge opening and said ink supply opening, and an energy generating element provided corresponding to said ink channel and adapted for generating energy to be utilized for ink discharge, comprising the steps of:

forming a first photosensitive material layer for ink channel formation, composed of a thermally crosslinkable positive resist sensitive to an ionizing radiation, on a substrate bearing thereon said energy generating element;

insolubilizing said first photosensitive material layer by crosslinking;

pattern exposing said insolubilized first photosensitive material layer by an ionizing radiation for forming the ink channel;

forming a second photosensitive material layer, sensitive to light of a main emission wavelength of 300 nm or longer, on said first photosensitive material layer;

pattern exposing said second photosensitive material layer by a light with a main emission wavelength of 300 nm or longer for forming the ink discharge opening and the ink supply opening; and developing said first photosensitive material layer and said second photosensitive material layer.

26. A method for producing a liquid-discharging recording head including an ink discharge opening, an ink channel communicating with said ink discharge opening, and an energy generating element provided corresponding to said ink channel and adapted for generating energy to be utilized for ink discharge, comprising the steps of:

forming a first photosensitive material layer for ink channel formation, composed of a thermally crosslinkable positive resist sensitive to an ionizing radiation, on a substrate bearing thereon said energy generating element and provided therein with an ink supply opening;

insolubilizing said first photosensitive material layer by crosslinking;

pattern exposing said insolubilized first photosensitive material layer by an ionizing radiation for forming the ink channel;

forming a second photosensitive material layer sensitive to light of a main emission wavelength of 300 nm or longer on said first photosensitive material layer;

pattern exposing said second photosensitive material layer by a light with a main emission wavelength of 300 nm or longer for forming the ink discharge opening; and developing said first photosensitive material layer and said second photosensitive material layer.

27. A liquid-discharging recording head produced by a method according to claim 25 or 26.

28. A liquid-discharging recording head according to claim 27, wherein said energy generating element is an electrothermal transducer adapted for generating thermal energy as the energy.

29. A liquid-discharging recording head according to claim 27, constructed as a full-line type head having a plurality of ink discharge openings arranged over an entire width of a recording area on a recording medium.

30. A liquid-discharging recording apparatus comprising:

a liquid-discharging recording head according to claim 27, having the ink discharge opening in opposed relation ship to a recording face of a recording medium; and a member for supporting said recording head.

31. A method for producing a liquid-discharging recording head including an ink discharge opening, an ink supply opening, an ink channel communicating with said ink discharge opening and said ink supply opening, and an energy generating element provided corresponding to said ink channel and adapted for generating energy to be utilized for ink discharge, comprising the steps of:

forming a first negative photosensitive material layer for ink channel formation, having a predetermined photosensitive spectral region, on a substrate bearing thereon said energy generating element;

pattern exposing said first photosensitive material layer within said predetermined photosensitive spectral region for forming the ink channel;

forming, on said first photosensitive material layer, a second negative photosensitive material layer, with a photosensitive spectral region different from that of said first photosensitive material layer;

pattern exposing said second negative photosensitive material layer within said different photosensitive spectral region for forming the ink discharge opening and the ink supply opening; and developing said first photosensitive material layer and said second photosensitive material layer.

32. A method for producing a recording head according to claim 31, wherein said first and said second photosensitive material layers each contain different photopolymerization initiators, whereby said first photosensitive material and said second photosensitive material layers have mutually different photosensitive spectral regions.

33. A method for producing a liquid-discharging recording head including an ink discharge opening, an ink supply opening, an ink channel communicating with said ink discharge opening and said ink supply opening, and an energy generating element provided corresponding to said ink channel and adapted for generating energy to be utilized for ink discharge, comprising the steps of:

forming a first negative photosensitive material layer for ink channel formation, on a substrate bearing thereon said energy generating element;

pattern exposing said first photosensitive material layer forming the ink channel;

forming, on said first photosensitive material layer, a second negative photosensitive material layer of a gelation sensitivity different from that of said first photosensitive material layer;

pattern exposing said second negative photosensitive material layer for forming the ink discharge opening and the ink supply opening; and developing said first photosensitive material layer and said second photosensitive material layer.

34. A method for producing a liquid-discharging recording head including an ink discharge opening, an ink supply opening, an ink channel communicating with said ink discharge opening and said ink supply opening, and an energy generating element provided corresponding to said ink channel and adapted for generating energy to be utilized for ink discharge, comprising the steps of:

forming a first negative photosensitive material layer for ink channel formation, on a substrate bearing thereon said energy generating element;

pattern exposing said first photosensitive material layer forming the ink channel;

forming, on said first photosensitive material layer, a second negative photosensitive material layer of an average molecular weight larger than that of said first photosensitive material layer;

pattern exposing said second photosensitive material layer for forming the ink discharge opening and the ink supply opening; and developing said first photosensitive layer and said second photosensitive material layer.

35. A method for producing a liquid-discharging recording head including an ink discharge opening, an ink supply opening, an ink channel communicating with said ink discharge opening and said ink supply opening, and an energy generating element provided corresponding to said ink channel and adapted for generating energy to be utilized for ink discharge, comprising the steps of:

forming a first negative photosensitive material layer for ink channel formation, on a substrate bearing thereon said energy generating element;

pattern exposing said first photosensitive material layer for forming the ink channel;

forming, on said first photosensitive material layer, a second negative photosensitive material layer containing a larger amount of photopolymerization initiator than in said first photosensitive material layer;

pattern exposing said second photosensitive material layer for forming the ink discharge opening and the ink supply opening; and developing said first photosensitive material layer and said second photosensitive material layer.

36. A method for producing a liquid-discharging recording head including an ink discharge opening, an ink channel communicating with said ink discharge opening and an ink supply opening, and an energy generating element provided corresponding to said ink channel and adapted for generating energy to be utilized for ink discharge, comprising the steps of:

forming a first negative photosensitive material layer for ink channel formation, having a predetermined photosensitive spectral region, on a substrate bearing thereon said energy generating element and provided therein with said ink supply opening;

pattern exposing said first photosensitive material layer within said predetermined photosensitive spectral region, for forming the ink channel;

forming, on said first photosensitive material layer, a second negative photosensitive material layer, with a photosensitive spectral region different from that of said first photosensitive material layer;

pattern exposing said second negative photosensitive material layer within said different photosensitive spectral region for forming the ink discharge opening; and developing said first photosensitive material layer and said second photosensitive material layer.

37. A method for producing a recording head, according to claim 36, wherein said first photosensitive material layer and said second photosensitive material layer each containing different photopolymerization initiators, whereby said first photosensitive material layer and said second photosensitive material layer have mutually different photosensitive spectral regions.

38. A method for producing a liquid-discharging recording head including an ink discharge opening, an ink channel communicating with said ink discharge opening, and an energy generating element provided corresponding to said ink channel and adapted for generating energy to be utilized for ink discharge, comprising the steps of:

forming a first negative photosensitive material layer for ink channel formation on a substrate bearing thereon said energy generating element and provided therein with an ink supply opening;

pattern exposing said first photosensitive material layer for forming the ink channel;

forming, on said first photosensitive material layer, a second negative photosensitive material layer of a gelation sensitivity to an exposing light different from that of said first photosensitive material layer;

pattern exposing said second photosensitive material layer for forming the ink discharge opening; and developing said first photosensitive material layer and said second photosensitive material layer.

39. A method for producing a liquid-discharging recording head including an ink discharge opening, an ink channel communicating with said ink discharge opening, and an energy generating element provided corresponding to said ink channel and adapted for generating energy to be utilized for ink discharge, comprising the steps of:

forming a first negative photosensitive material layer for ink channel formation, on a substrate bearing thereon said energy generating element;

pattern exposing said first photosensitive material layer for forming the ink channel;

forming, on said first photosensitive material layer, a second negative photosensitive material layer of an average molecular weight larger than that of said first photosensitive material layer;

pattern exposing said second photosensitive material layer for forming the ink discharge opening; and developing said first photosensitive material layer and said second photosensitive material layer.

40. A method for producing a liquid-discharging recording head including an ink discharge opening, an ink channel communicating with said ink discharge opening, and an energy generating element provided corresponding to said ink channel and adapted for generating energy to be utilized for ink discharge, comprising the steps of:

forming a first negative photosensitive material layer for ink channel formation, on a substrate bearing thereon said energy generating element and provided therein with an ink supply opening;

pattern exposing said first photosensitive material layer for forming the ink channel;

forming, on said first photosensitive material layer, a second negative photosensitive material layer containing a larger amount of photopolymerization initiator than in said first photosensitive material layer;

pattern exposing said second photosensitive material layer for forming the ink discharge opening; and developing said first photosensitive material layer and said second photosensitive material layer.

41. A liquid-discharging recording head produced by a method according to any one of the claims 31 to 40.

42. A liquid-discharging recording head according to claim 41, wherein said energy generating element is an electrothermal transducer for generating thermal energy as the energy.

43. A liquid-discharging recording head according to claim 41, constructed as a full-line type head, having a plurality of ink discharge openings arranged over an entire width of a recording area of a recording medium.

44. A liquid-discharging recording apparatus comprising:

a liquid-discharging recording head according to claim 41, having the ink discharge opening in opposed relationship to a recording face of a recording medium; and a member for supporting said recording head.

45. A method for producing a liquid-discharging recording head including an ink discharge opening, an ink supply opening, an ink channel communicating with said ink discharge opening and said ink supply opening, and an energy generating element provided corresponding to said ink channel and adapted for generating energy to be utilized for ink discharge, comprising:

A) a step of forming a first negative photosensitive material layer composed of an uncrosslinking resist on a substrate bearing thereon said energy generating element, pattern exposing said first photosensitive material layer for forming the ink discharge opening and the ink channel along said energy generating element, and developing said first photosensitive material layer, thereby dissolving and removing said first photosensitive material layer except for portions corresponding to said ink discharge opening and said ink channel;

B) a step of laminating a second photosensitive material layer composed of a thermally crosslinkable positive resist on the substrate bearing thereon said portions corresponding to the ink discharge opening and the ink channel, thermally crosslinking said second photosensitive material layer, and pattern exposing said layer for forming the ink supply opening by an ionizing radiation; and C) a step of developing and removing the uncrosslinked resist corresponding to the ink channel and the ink discharge opening, and the latent image formed for the pattern exposure for forming the ink supply opening;

wherein said steps A, B and C conducted in successive order.

46. A liquid-discharging recording head produced by a method according to claim 45.

47. A liquid-discharging recording head according to claim 46, wherein said energy generating element is an electrothermal transducer for generating thermal energy as the energy.

48. A liquid-discharging recording head according to claim 46 or 47, constructed as a full-line type head, having a plurality of ink discharge openings over an entire width of a recording area of a recording medium.

49. A liquid-discharging recording apparatus comprising:

a liquid-discharging recording head according to claim 46 or 47, having the ink discharge opening in opposed relationship to a recording face of a recording medium; and a member for supporting said recording head.

* * * * *

UNITED STATES PATENT AND TRADEMARK OFFICE

CERTIFICATE OF CORRECTION

PATENT NO. : 5,331,344

DATED : July 19, 1994

INVENTOR(S) : MASASHI MIYAGAWA, ET AL.

It is certified that error appears in the above-identified patent and that said Letters Patent is hereby corrected as shown below:

COLUMN 2

Line 50, "steps" should read --the steps--.

COLUMN 4

Line 18, "Utilized" should read --utilized--.

COLUMN 5

Line 41, "potosensitive" should read --photosensitive--.

COLUMN 6

Line 54, "layer." should read --layers.--.

COLUMN 8

Line 51, "the removing" should read --and removing--.

COLUMN 9

Line 18, "an" should read --and--.
Line 34, "which-the" should read --which the--.

COLUMN 10

Line 25, "generating" should read --generated--.
Line 65, "u-position." should read --α-position.--.

UNITED STATES PATENT AND TRADEMARK OFFICE

CERTIFICATE OF CORRECTION

PATENT NO. : 5,331,344

DATED : July 19, 1994

INVENTOR(S) : MASASHI MIYAGAWA, ET AL.

It is certified that error appears in the above-identified patent and that said Letters Patent is hereby corrected as shown below:

COLUMN 11

Line 26, "polyvinylphelocene," should read --polyvinylferrocene--.
Line 28, "polystylene," should read --polystyrene,--.
Line 30, "gellation" should read --gelation--.
Line 32, "hisazide" should read --bisazide--.
Line 53, "hisazide" should read --bisazide--.
Line 58, "hisazide" should read --bisazide--.
Line 62, "his-" should read --bis- --.
Line 61, "his-" should read--bis--.

COLUMN 14

Line 23, ".a" should read --a--.
Line 43, "unit) wherein" should read --unit)- wherein--.
Line 57, "polymechacrylic" should read --polymethacrylic--.

COLUMN 16

Line 14, "gellation" should read --gelation--.
Line 18, "princila" should read --principal--.

COLUMN 17

Line 26, "thermoserring." should read --thermosetting.--.

COLUMN 18

Line 39, "However" should read --However,--.
Line 65, "sever" should read --severe--.

UNITED STATES PATENT AND TRADEMARK OFFICE
CERTIFICATE OF CORRECTION

PATENT NO. : 5,331,344

DATED : July 19, 1994

INVENTOR(S) : MASASHI MIYAGAWA, ET AL.

It is certified that error appears in the above-identified patent and that said Letters Patent is hereby corrected as shown below:

COLUMN 19

Line 2, "details," should read --detail,--.
Line 6, "thermoserring" should read --thermosetting--.
Line 40, "and chloro" should read --and fluoro--.
Line 50, "thermoserring" should read --thermosetting--.

COLUMN 20

Line 8, "extremely" should read --extreme--.
Line 48, "extremely" should read --extreme--.

COLUMN 24

Line 29, "following" should read --the following--.
Line 41, "have" should read --has--.
Line 59, "able," should read --able.--.

COLUMN 25

Line 45, "thickess" should read --thickness--.
Line 56, "and" should be deleted.

COLUMN 26

Line 23, "includes" should read --include--.
Line 32, "α-positive" should read --α-position--.
Line 34, "e-cyano" should read --α-cyano--.
Line 35, "-methyl" should read --methyl--.
Line 38, "Photo decomposable" should read --Photodecomposable--.
Line 59, "thickess" should read --thickness--.

UNITED STATES PATENT AND TRADEMARK OFFICE
CERTIFICATE OF CORRECTION

PATENT NO. : 5,331,344

DATED : July 19, 1994

INVENTOR(S) : MASASHI MIYAGAWA, ET AL.

It is certified that error appears in the above-identified patent and that said Letters Patent is hereby corrected as shown below:

COLUMN 28

Line 15, "which" should read --which is--.
Line 56, "following" should read --the following--.

COLUMN 29

Line 5, "particularly" should read --particular--.

COLUMN 30

Line 25, "liquidous" should read --liquid--.
Line 67, "expel" should read --expelling--.

COLUMN 32

Line 12, "25 pm" should read --25 μm--.
Line 42, "resists" should read --resist,--.

COLUMN 33

Figure 1:
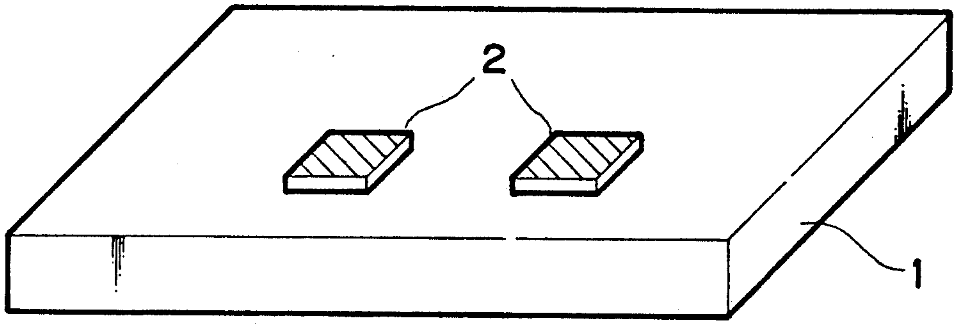
FIG. 1 is a schematic perspective view of a substrate prior to the formation of the ink channel and the ink discharge opening.
Figure 11:
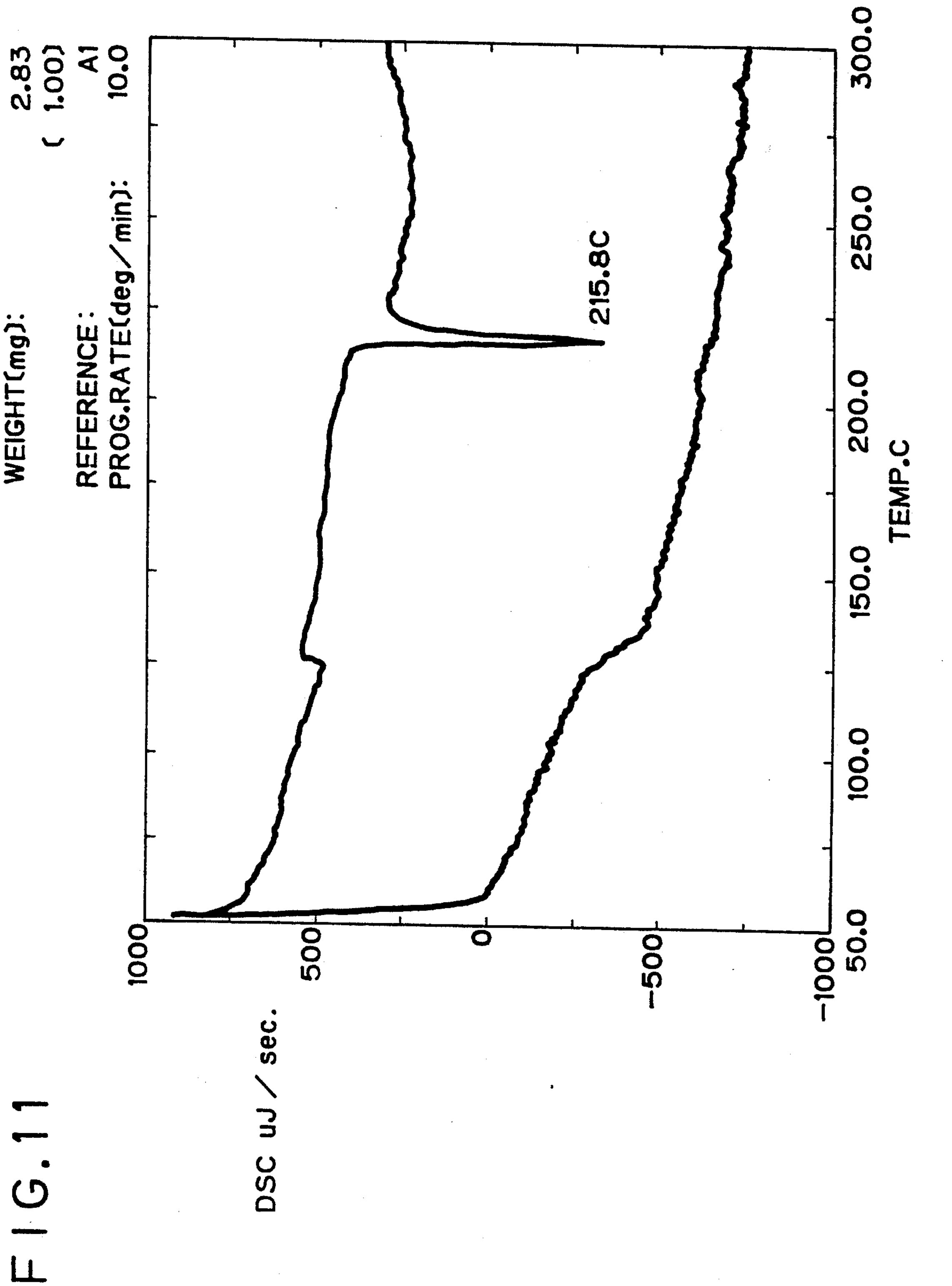
FIGS. 11 and 12 are DSC charts for measuring the crosslinking temperature of crosslinkable positive resist.

Line 60, "FIG. 1)" should read --FIG. 11)--.

COLUMN 35

Line 4, "( 20 mol. % )" should read --(20 mol. %)--.
Line 8, "drown in" should read --added to--.
Line 11, "drowning" should read --adding--.
Line 33, "film the" should read --film of the--.
Line 36, "toray Co.)," should read --Toray Co.),--.
Line 65, "as" should read --as in--.

UNITED STATES PATENT AND TRADEMARK OFFICE
CERTIFICATE OF CORRECTION

PATENT NO. : 5,331,344

DATED : July 19, 1994

INVENTOR(S) : MASASHI MIYAGAWA, ET AL.

It is certified that error appears in the above-identified patent and that said Letters Patent is hereby corrected as shown below:

COLUMN 38

Line 4, "openings" should read --openings,--.
Line 46, "alikaline" should read --alkaline--.

COLUMN 39

Line 15, "hisazide" should read --bisazide--.

COLUMN 40

Line 40, "methacrylatemethacrylic" should read --methacrylate-methacrylic--.

COLUMN 41

Line 17, "baked" should read--baking--.
Line 31, "drowning" should read --adding--.
Line 40, "the" should read --The--.

COLUMN 42

Line 54, "steps" should read --the steps--.

COLUMN 43

Line 55, "resists" should read --resist--.
Line 57, "opening" should read --opening,--.
Line 63, "sists" should read --sist--.
Line 67, "discharg-" should read --discharge--.
Line 68, "ing" should be deleted.

UNITED STATES PATENT AND TRADEMARK OFFICE
CERTIFICATE OF CORRECTION

PATENT NO. : 5,331,344

DATED : July 19, 1994

INVENTOR(S) : MASAHI MIYAGAWA, ET AL.

It is certified that error appears in the above-identified patent and that said Letters Patent is hereby corrected as shown below:

COLUMN 44

Line 48, "exposure" should read --exposures--.
Line 60, "a forming" should read --forming--.

COLUMN 45

Line 38, "generate" should read --generating--.

COLUMN 47

Line 15, "relation ship" should read --relationship--.
Line 64, "layer" should read --layer for--.

COLUMN 48

Line 18, "layer" should read --layer for--.
Line 26, "layer" should read --material layer--.

COLUMN 49

Line 9, "head," should read --head--.
Line 12, "containing" should read --contain--.

UNITED STATES PATENT AND TRADEMARK OFFICE

CERTIFICATE OF CORRECTION

PATENT NO. : 5,331,344

DATED : July 19, 1994

INVENTOR(S) : MASASHI MIYAGAWA, ET AL.

It is certified that error appears in the above-identified patent and that said Letters Patent is hereby corrected as shown below:

COLUMN 50

Line 59, "formed for" should read --formed by--.
Line 61, "conducted" should read --are conducted--.

Signed and Sealed this

Eighteenth Day of April, 1995

Attest:

BRUCE LEHMAN

Attesting Officer

*Commissioner of Patents and Trademarks*